US010592084B2

(12) United States Patent
Zummo et al.

(10) Patent No.: US 10,592,084 B2
(45) Date of Patent: Mar. 17, 2020

(54) TOOLS, SYSTEMS AND METHODS FOR CONFIGURING A BUILDING MANAGEMENT SYSTEM

(71) Applicant: Johnson Controls Technology Company, Plymouth, MI (US)

(72) Inventors: Michael J. Zummo, Milwaukee, WI (US); Gregory T. Reichl, Kaukauna, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 317 days.

(21) Appl. No.: 15/375,064

(22) Filed: Dec. 9, 2016

(65) Prior Publication Data

US 2018/0164993 A1    Jun. 14, 2018

(51) Int. Cl.
| | | |
|---|---|---|
| *G06F 3/0482* | (2013.01) | |
| *G06F 3/0484* | (2013.01) | |
| *H04M 1/725* | (2006.01) | |
| *G06Q 10/00* | (2012.01) | |
| *G06Q 50/16* | (2012.01) | |
| *G06Q 10/10* | (2012.01) | |

(52) U.S. Cl.
CPC ........ *G06F 3/04847* (2013.01); *G06F 3/0482* (2013.01); *G06Q 10/00* (2013.01); *G06Q 10/10* (2013.01); *G06Q 50/16* (2013.01); *H04M 1/72533* (2013.01)

(58) Field of Classification Search
CPC .............. G06F 3/04847; G06F 3/0482; H04M 1/72533
See application file for complete search history.

(56) References Cited

U.S. PATENT DOCUMENTS

| | | | |
|---|---|---|---|
| 9,038,897 B2 | 5/2015 | Jayaprakash et al. | |
| 9,111,221 B1 | 8/2015 | Kelly et al. | |
| 9,879,875 B2* | 1/2018 | Quam | F24F 11/63 |
| 10,142,204 B2* | 11/2018 | Nickolov | H04L 43/0817 |
| 2010/0286937 A1* | 11/2010 | Hedley | G06O 30/02 |
| | | | 702/60 |
| 2013/0304259 A1 | 11/2013 | Meruva et al. | |
| 2014/0059467 A1* | 2/2014 | Mairs | G06F 3/0482 |
| | | | 715/771 |
| 2015/0019736 A1 | 1/2015 | Imes et al. | |

(Continued)

*Primary Examiner* — Shourjo Dasgupta
(74) *Attorney, Agent, or Firm* — Foley & Lardner LLP

(57) ABSTRACT

A building management system (BMS) network interface device including an external communication device configured to provide communication between the BMS network interface and a number of user devices, over a first network. The device further includes a BMS network communication interface for communicating with one or more BMS devices over a second network. The device includes a processing circuit, which includes a number of tools configured to be accessed via a user interface, and further configured to communicate with one or more BMS devices on the second network. The tools include a tailored view tool and a device checkout tool. The tailored view is configured to allow a user to modify the information displayed on the user interface. The device checkout tool is configured to allow a user to select one or more devices on the second network and to modify one or more attributes of the selected devices using the user interface.

19 Claims, 39 Drawing Sheets

(56) References Cited

U.S. PATENT DOCUMENTS

| | | | |
|---|---|---|---|
| 2015/0212714 A1* | 7/2015 | Hua | G06F 3/04847 |
| | | | 715/739 |
| 2015/0267936 A1 | 9/2015 | Wright et al. | |
| 2015/0285526 A1* | 10/2015 | Smith | F24F 11/30 |
| | | | 700/276 |
| 2015/0339736 A1* | 11/2015 | Bennett | G06Q 30/016 |
| | | | 705/306 |
| 2016/0104363 A1* | 4/2016 | Dorfstatter | H04N 7/18 |
| | | | 348/143 |
| 2016/0123614 A1 | 5/2016 | Krishnasamy et al. | |
| 2016/0261465 A1* | 9/2016 | Gupta | H04L 12/2816 |
| 2016/0343241 A1* | 11/2016 | Rossi | G08B 5/36 |
| 2016/0367927 A1* | 12/2016 | Blackley | B01D 39/08 |
| 2017/0052536 A1* | 2/2017 | Warner | G06Q 10/06312 |
| 2018/0177035 A1* | 6/2018 | Vangeel | H05B 33/089 |

* cited by examiner

TOOLS, SYSTEMS AND METHODS FOR CONFIGURING A BUILDING MANAGEMENT SYSTEM

BACKGROUND

The present disclosure relates generally to building management systems and associated devices. The present disclosure relates more particularly to devices, systems and methods for providing a configuration tool for a building management system to allow for a user to configure the BMS using a mobile device.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices can be installed in any environment (e.g., an indoor area or an outdoor area) and the environment can include any number of buildings, spaces, zones, rooms, or areas. A BMS can include a variety of devices (e.g., HVAC devices, controllers, chillers, fans, sensors, etc.) configured to facilitate monitoring and controlling the building space. Throughout this disclosure, such devices are referred to as BMS devices or building equipment.

In some existing systems, a dedicated configuration device may be required to configure, program, and/or verify operation of a BMS. These devices may often be proprietary and cumbersome to use. Further, existing tools and devices may provide an interface to a BMS in lieu of a dedicated configuration device; however, the functionality of these devices is often limited. For example, current interface devices may allow a user to view devices and basic information using a laptop or other mobile device, but a dedicated configuration device may be required to modify the BMS, or to perform any advanced functions. Thus, it would be desirous to have an interface device with configuration functionality that would allow a user to configure or modify a BMS via a mobile device.

SUMMARY

One implementation of the present disclosure is a building management system BMS network interface device. The device includes an external communication device configured to provide communication between the BMS network interface device and one or more user devices over a first network. The device further includes a BMS network communication interface for communicating with one or more BMS devices over a second network. The device also includes a processing circuit, including a plurality of tools. The tools are configured to be accessed via a user interface, and to communicate with one or more BMS devices on the second network. The tools include a tailored view tool and a device checkout tool. The tailored view tool is configured to allow a user to modify the user interface by selecting what information is displayed and the device checkout tool is configured to allow a user to select one or more devices on the second network and to modify one or more attributes of the selected devices using the user interface.

Another implementation of the present disclosure is a building management system. The system includes a field controller device, and one or more field devices, the one or more field devices in communication with the field controller. A configuration device in communication with the field controller. The configuration device includes a processing circuit, including a number of tools configured allow a user, via a user interface, to configure one or more BMS devices on the BMS network, the number of tools comprising an air balancing tool and a device checkout tool. The system further includes a user device in communication with the configuration device. The device checkout tool is configured to allow a user to view one or more parameters associated with the field devices using the user device.

A further implementation of the present disclosure is a BMS interface device for providing communication between a user device and one or more BMS devices on a BMS network. The device includes a user device communication circuit configured to provide communication between the BMS interface device and one or more user devices. A BMS network communication circuit is configured to provide communication between the BMS interface device and the BMS network. The device further includes a processing circuit, including a tailored view tool, a device checkout tool, and an air balancing tool. The tailored view tool is configured to allow a user to modify the information displayed on the user interface. The device checkout tool is configured to allow a user to select one or more devices on the BMS network and to view the data points associated with the selected devices. The air balancing tool is configured to balance an airflow associated with one or more devices on the BMS network. The air balancing tool is further configured to automatically calibrate one or more devices on the BMS by generating a gain value of the devices based on at least a measured minimum air flow, a maximum air flow, and a differential pressure.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems, devices and methods for configuring a BMS are described, according to various exemplary embodiments. The devices, systems and methods described herein may be used to allow a BMS to be configured via standard computing devices, including mobile devices (smartphones, tablets, laptops, etc.). An interface device may be used to provide the functionality and access to the standard computing devices. Example functions provided by the interface devices can include providing tailored summaries, project creation and modification, reporting, device checkout, data point commands, trending, balancing, and/or other functions.

Building Management System and HVAC System

Figure 1:
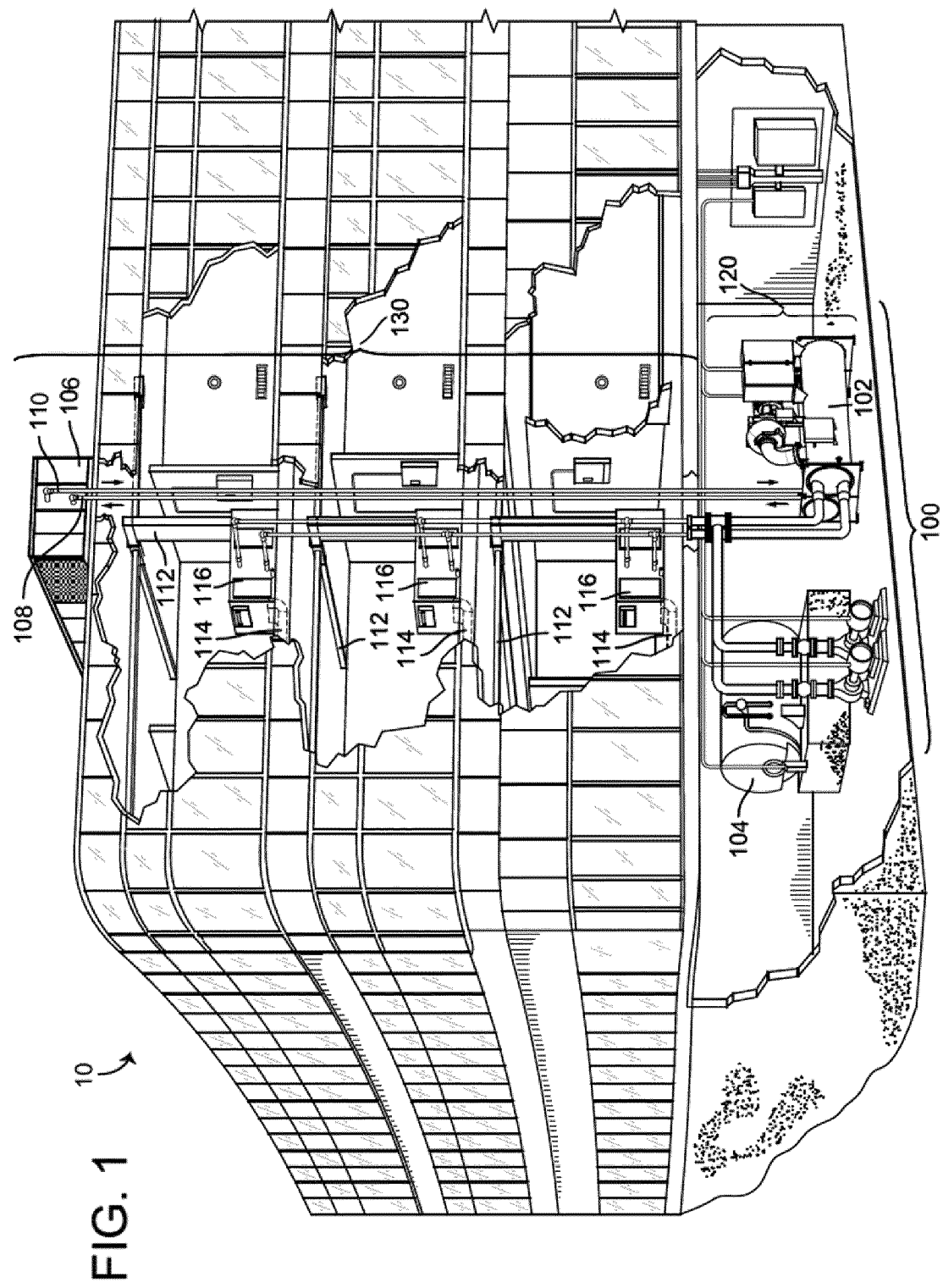
FIG. 1 is a drawing of a building equipped with a HVAC system, according to an exemplary embodiment.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, or any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
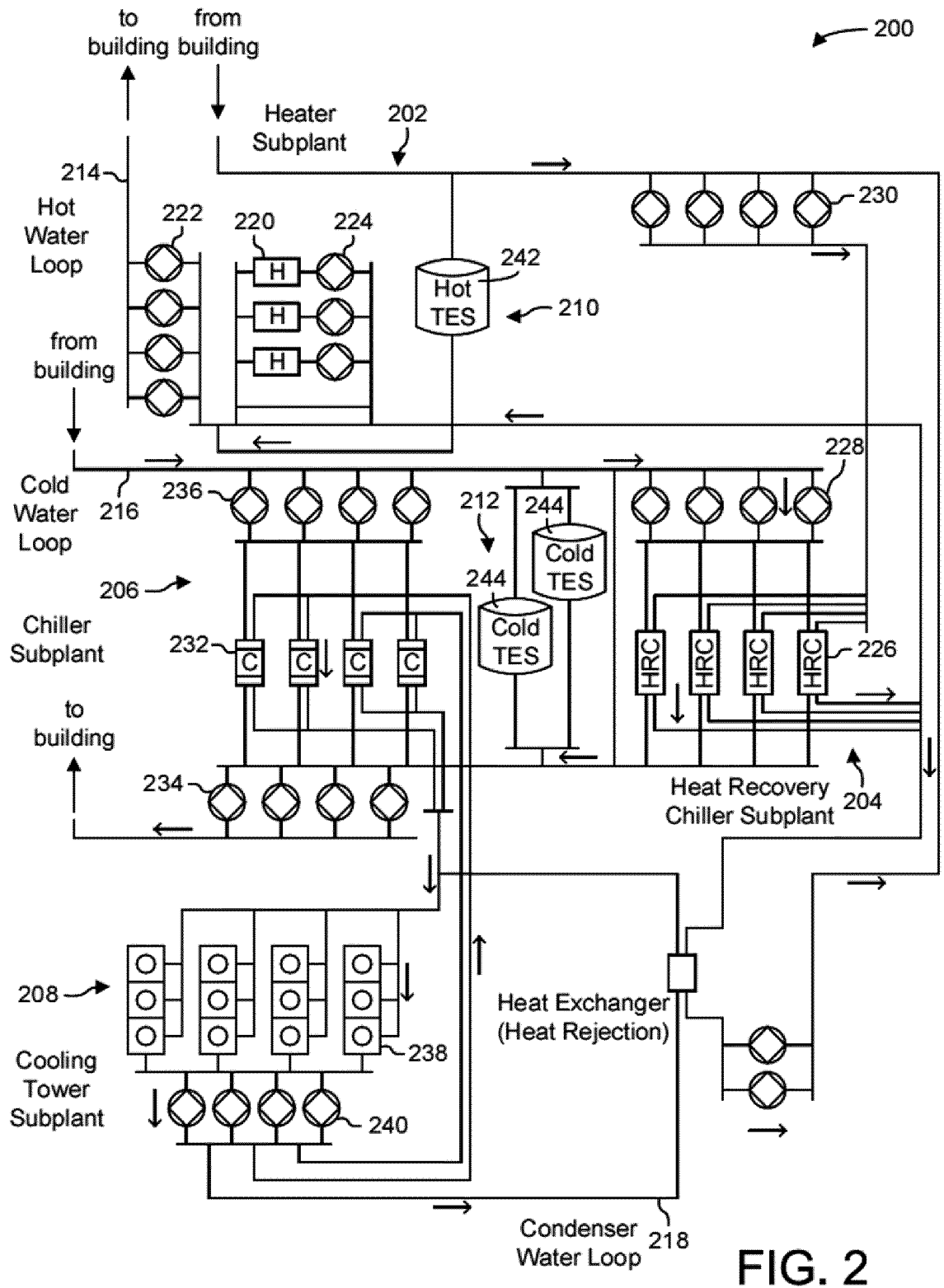
FIG. 2 is a block diagram of a waterside system that may be used in conjunction with the building of FIG. 1, according to an exemplary embodiment.

Referring now to FIG. 2, a block diagram of a waterside system 200 is shown, according to some embodiments. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between the chiller subplant 206 and the building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
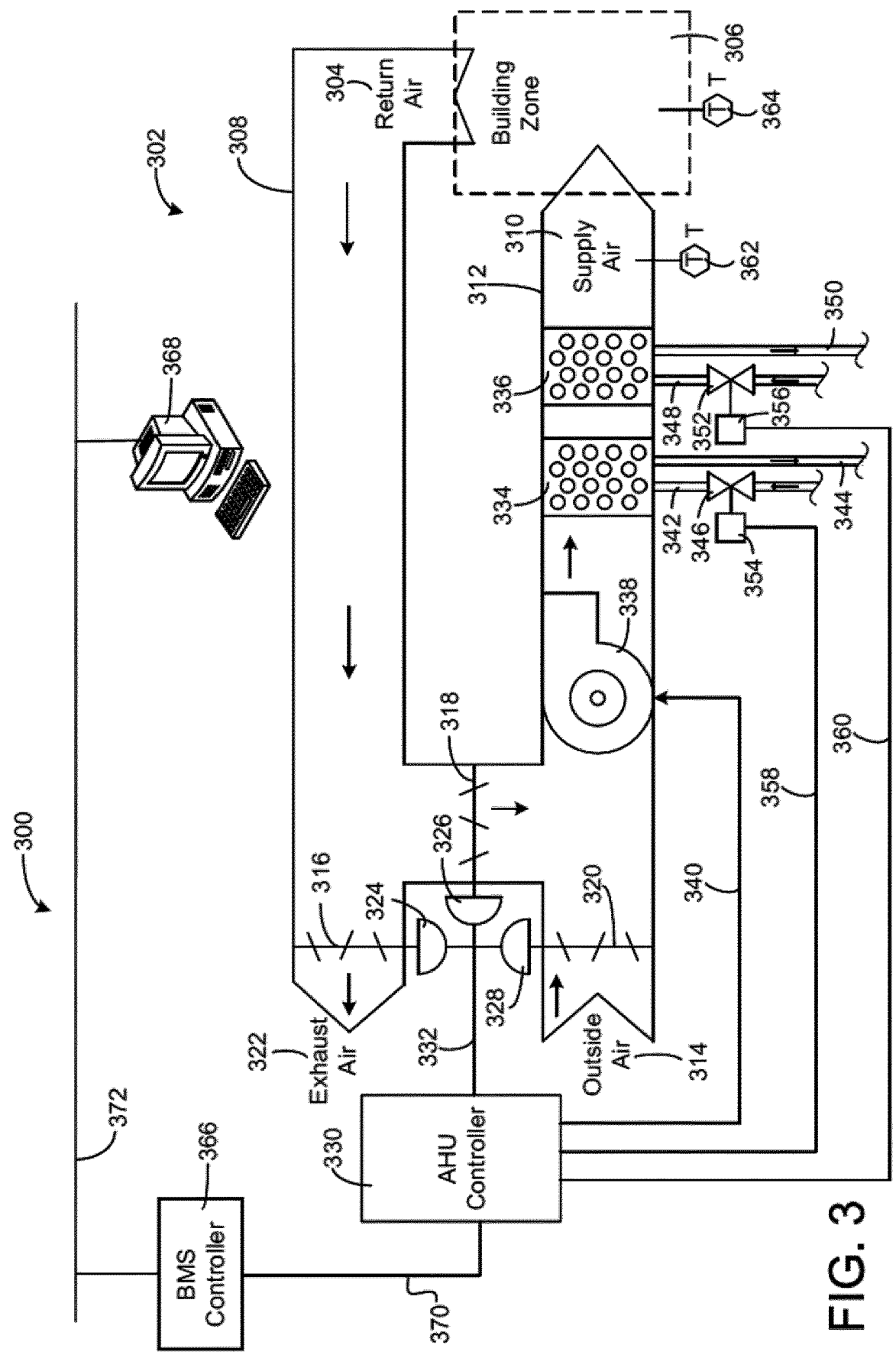
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more humanmachine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
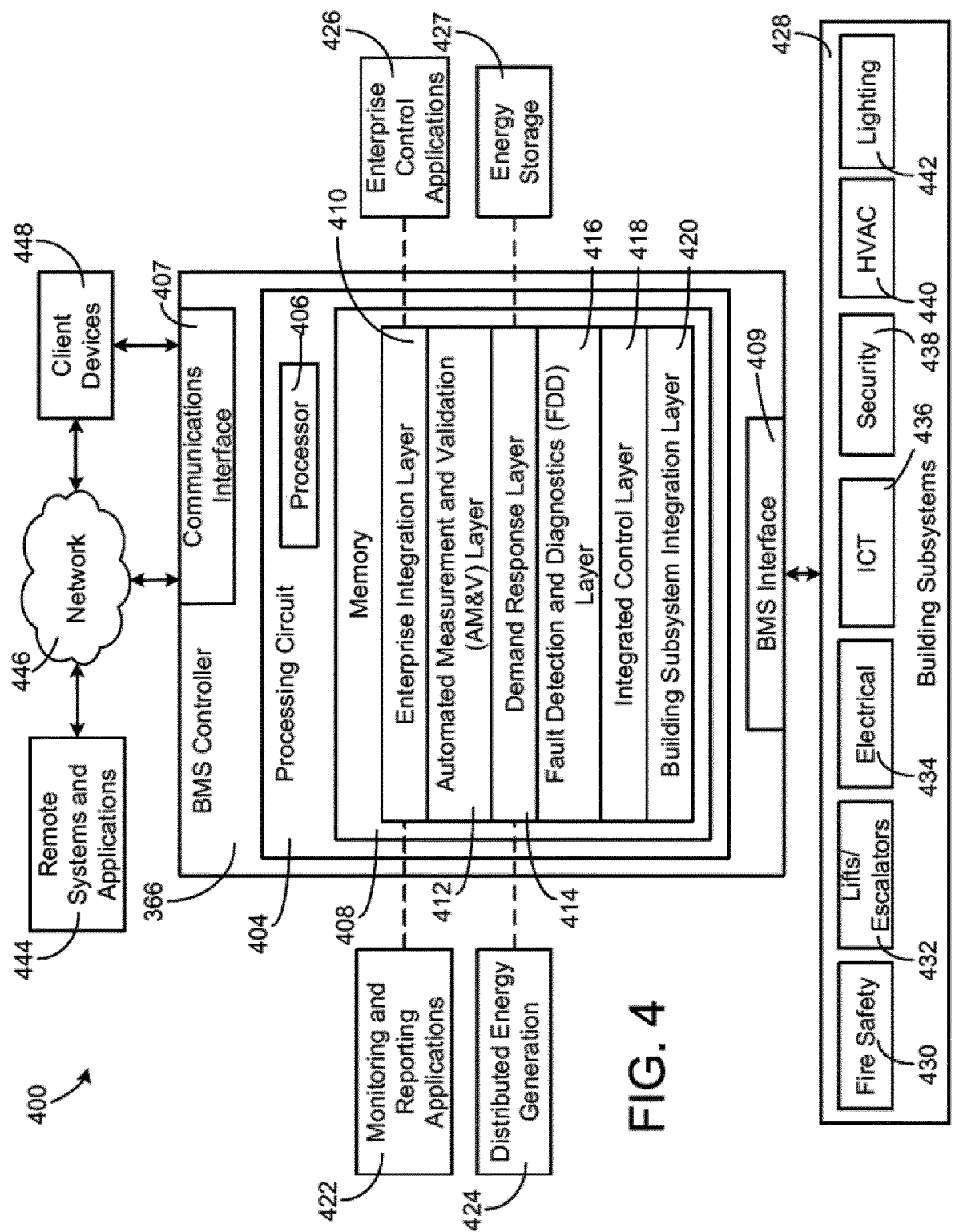
FIG. 4 is a block diagram of a building management system (BMS) that may be used to monitor and/or control the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

BMS Interface Device

Figure 5:
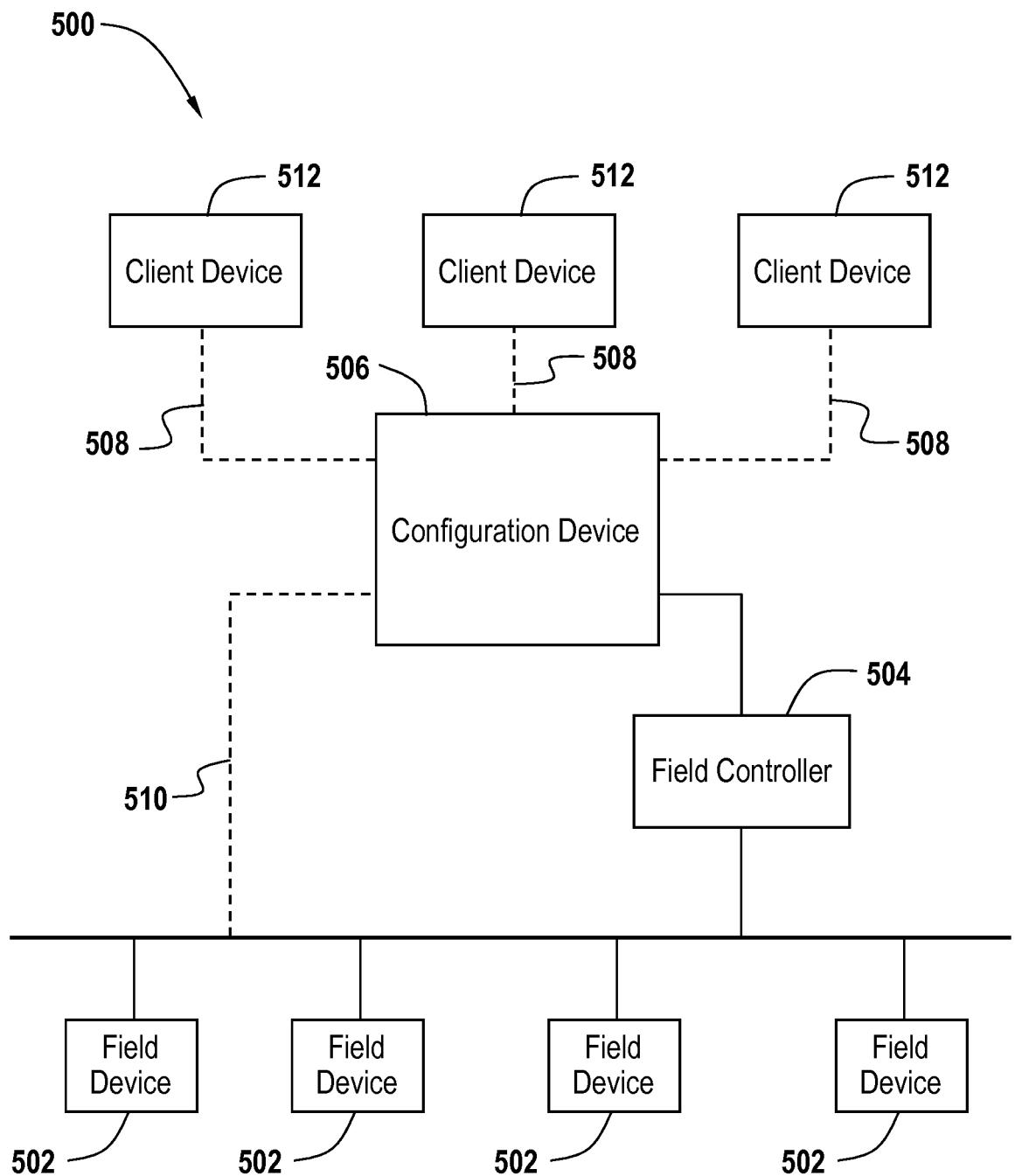
FIG. 5 is a block diagram illustrating a building management system, according to some embodiments.

Referring now to FIG. 5, a block diagram illustrating a building management system (BMS) 500, according to some embodiments. The BMS 500 may include a number of field devices 502. As stated above, the field devices 502 can be any number of devices associated with the BMS 500. Example field devices can include input/output (I/O) devices, actuators, valves, AHUs, VAVs, chillers, or other devices associated with the BMS 500. The BMS 500 can further include one or more field controllers 504. The field controller 504 may be any supervisory controller associated with the BMS 500. For example, the field controller 504 may be an Network Automation Engine (NAE) controller from Johnson Controls. However, other control devices are contemplated, such as FEC, FAC, VMA, PCA, PCG and/or PCV series devices from Johnson Controls, and/or other field controller devices. The BMS 500 may further include a BMS interface device 506. The BMS interface device 506 may provide an interface between an external network 508 and a BMS network 510. The external network 508 may be an IP based network, such as TCP/IP, Wi-Fi, or other IP based network. Further, the external network 508 may be a wired network or a wireless network. Example wired networks include TCP/IP, serial (RS-232, RS-485, USB), or other wired network type. Example wireless networks can include Wi-Fi, Wi-Max, Bluetooth, LoRA, NFC, cellular (3G, 4G, LTE, CDMA), or other wireless network types. In one embodiment, the external network can be used to connect the BMS interface device 506 with one or more client devices 512. The client devices 512 may include personal computing devices such as personal computers (PC's) and/or laptop computers. Further, the client devices 512 may also include mobile smart devices, such as smartphones (iPhone, Android phone, Windows phone), table computers (iPad, Android tablet, Microsoft Surface) or other mobile smart device. In some embodiments, more than one client device 512 may communicate with the bms interface device 506 at a time.

The BMS network 510 may be a bms network 510 such as BACnet/MSPT, BACnet IP, or the like. In some embodiments, the BMS network 510 is a wired network, such as RS-485 or TCP/IP. In other embodiments, the BMS network 510 may be a wireless network such as Wi-Fi, Bluetooth, Zigbee, NFC, LoRa, cellular (3G, 4G, LTE, CDMA) or other wireless communication protocol. As shown in FIG. 5, the BMS interface device 506 may communicate with the field controller 504 via the BMS network 510. The field controller 504 may then communicate directly to the one or more field devices 502 via the BMS network 510. In some embodiments, the BMS interface device 506 may communicate with the field controller directly via a dedicated communication link. However, in other embodiments, the BMS interface device 506 communicates with the field controller 504 via the BMS network 510. Further, in some embodiments, the BMS interface device 506 communicates directly with the one or more field devices 502 via the BMS network 510.

Figure 6:
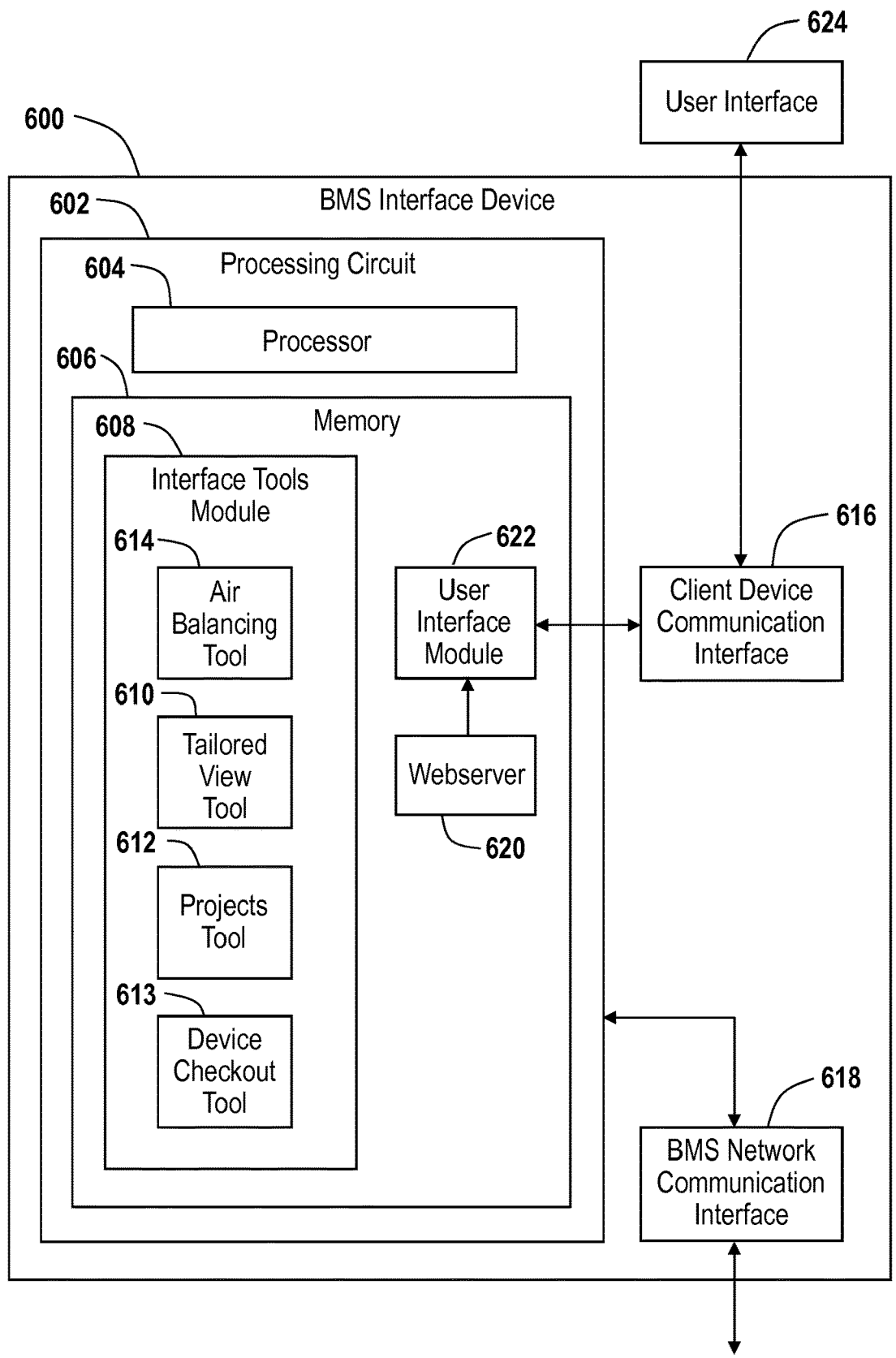
FIG. 6 is a block diagram illustrating a detailed view of the BMS interface device of FIG. 5, according to some embodiments.

Turning now to FIG. 6, a block diagram illustrating a detailed view of a BMS interface device 600 is shown, according to some embodiments. The BMS interface device 600 can be used as the BMS interface device 506 described above. For example, the BMS interface device 600 can be a Mobile Access Portal (MAP) gateway from Johnson Controls, Inc. The BMS interface device 600 may include a processing circuit 602. The processing circuit 602 may include a processor 604 and a memory 606. The processor 604 may be a general purpose or specific purpose processor, an application specific integrated circuit (ASIC), one or more field programmable gate arrays (FPGAs), a group of processing components, or other suitable processing components. The processor 604 is configured to execute computer code or instructions stored in the memory 606 or received from other computer readable media (e.g., CDROM, network storage, a remote server, etc.).

The memory 606 may include one or more devices (e.g., memory units, memory devices, storage devices, etc.) for storing data and/or computer code for completing and/or facilitating the various processes described in the present disclosure. The memory 606 may include random access memory (RAM), read-only memory (ROM), hard drive storage, temporary storage, non-volatile memory, flash memory, optical memory, or any other suitable memory for storing software objects and/or computer instructions. The memory 606 may include database components, object code components, script components, or any other type of information structure for supporting the various activities and information structures described in the present disclosure. The memory 606 may be communicably connected to the processor 604 via the processing circuit 602 and may include computer code for executing (e.g., by the processor) one or more processes described herein. When the processor 604 executes instructions stored in the memory 606, the processor 604 generally configures the BMS interface device 600 (and more particularly the processing circuit 602) to complete such activities.

The memory 606 may further include an interface tools module 608. The interface tools module 608 may include one or more tools that can be executed via the processing circuit 602 of the BMS interface device 600. Example tools within the interface tools module 608 can include a tailored view tool 610, a projects tool 612, a device checkout tool 613, and a balancing tool 614. However, it is contemplated that other tools may be stored within the interface tools module 608. The individual tools within the interface tools module 608 will be discussed in more detail below. The BMS interface device 600 may further include an external network communication interface 616, and a BMS network communication interface 618. The external network communication interface 616 may be a wired network interface for use with a wired network, or a wireless network interface for use with a wireless network. Example wired networks include TCP/IP, serial (RS-232, RS-485, USB), or other wired network type. Example wireless networks can include Wi-Fi, Wi-Max, Bluetooth, LoRA, NFC, cellular (3G, 4G, LTE, CDMA), or other wireless network types. As described above, the external network communication interface 616 may be used to communicate with one or more client devices on an external network. The BMS network communication interface 618 communicate with a bms network 510 such as BACnet/MSPT, BACnet IP, or the like. In some embodiments, the BMS network communication interface 618 is a wired network interface for communication over wired networks, such as RS-485 or TCP/IP. In other embodiments, the BMS network communication interface 618 may be a wireless network interface, for communication over wireless networks, such as Wi-Fi, Bluetooth, Zigbee, NFC, LoRa, cellular (3G, 4G, LTE, CDMA) or other wireless communication protocol. The BMS interface device 600 may further include a web-server 620. The web-server 620 allows for a user to access the BMS interface device 600 via a user device. The web-server 620 provides a user interface 624 for the user on their mobile device. In some embodiments, the web-server 620 may in communication with a user interface module 622 of the BMS interface device 600. The user interface module 622 can provide the user interface graphics to the web-server 620 for generation, and can interpret inputs provided by a user on the mobile device for processing using the processing circuit 602.

Figure 7:
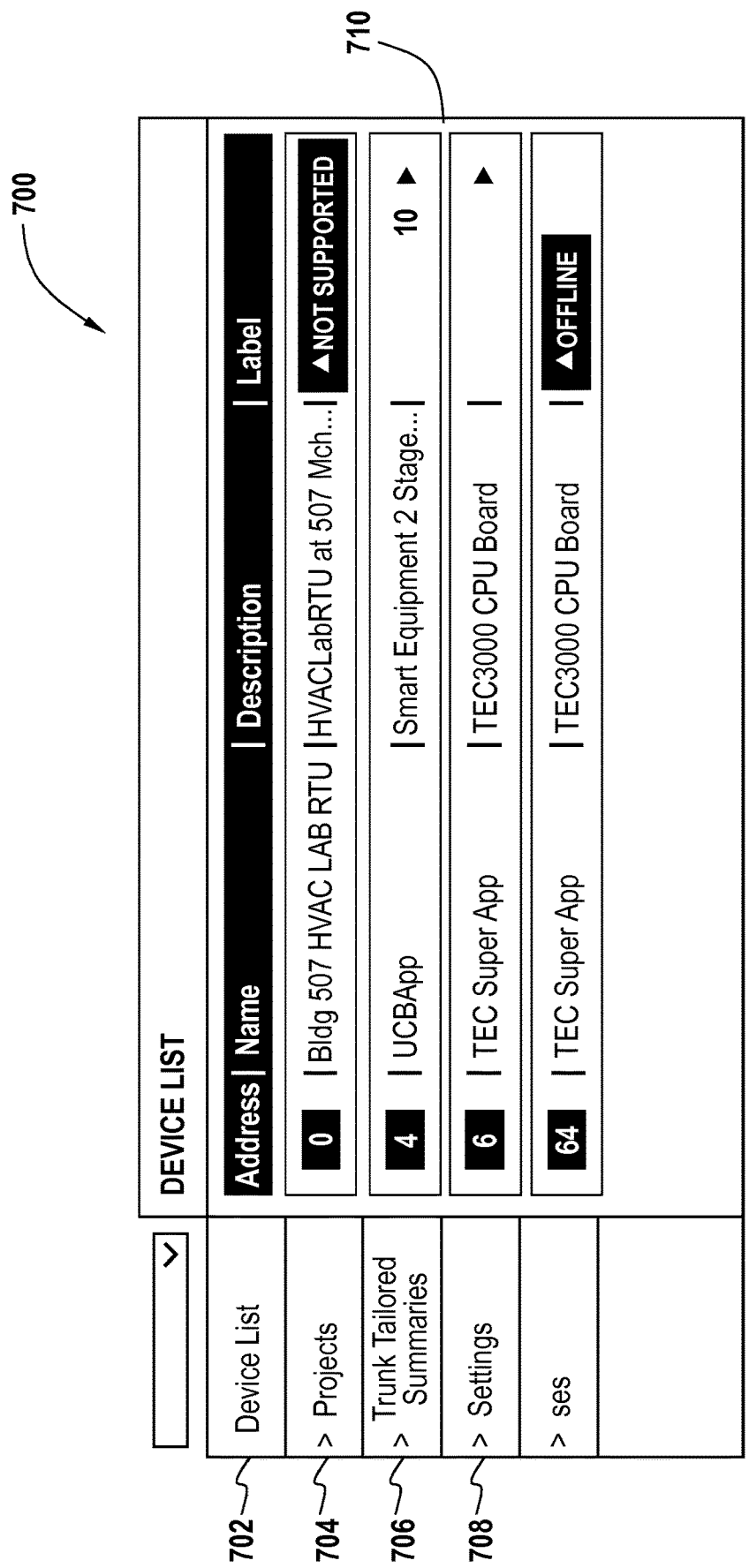
FIG. 7 is a screenshot illustrating a home page of a user interface of the BMS interface device of FIG. 6, according to some embodiments.

The BMS interface device 600, via the web-server 620, can allow a user, via their user device, to access a user interface 624 generated by the user interface module 622. In one embodiment, the user interface 624 can be generated via the web-server 620 and rendered on a mobile device, such as a smartphone (iPhone, Android phone, Windows phone, etc.), a tablet computer (iPad, Android tablet, Microsoft Surface, etc.), or a laptop computer. In some embodiments, the web-server 620 is configured to provide a scalable user interface that will adapt to the type of device being used to access the BMS interface device 600. For example, the user interface 624 for use with a smartphone, may be configured differently than a user interface 624 for use with a tablet computer, and vice versa. The user interface 624 can allow a user to access one or more of the tools within the interface tools module 608. The web-server 620 may provide a user interface 624 with modal windows behavior. A modal window is a child window that generally requires a user to interact with it before the user interface 624 can return to operating a parent application. Turning now to FIG. 7, a screenshot illustrating a home page 700 of a user interface 624 of a BMS interface device, such as BMS interface device 600, is shown, according to some embodiments. In some embodiments, a user may be required to log into the BMS interface device via a log in screen presented by the web-server 620 prior to accessing one or more of the tools within the BMS interface device. The home page 700, can include a device list tab 702, a projects tab 704, a tailored summaries tab 706, and a settings tab 708. In some embodiments, there may be more or fewer tabs, as required. For example, the number of tabs may be dependent on which tools are utilized for a given BMS. The projects tab 704 may be configured to open a projects dialog screen, as will be described below. The tailored summaries tab 706 may be configured to open a tailored summaries dialog, as will be described below. The settings tab 708 may be configured to open a settings dialog, as will be described below.

The device list tab 702 may access the device list screen 710. The device list screen 710 is configured to provide a listing of field devices on a BMS network. In some embodiments, the BMS interface device may only have access to a portion of the BMS network, such as a trunk line associated with field devices downstream of a supervisory device. In other embodiments, the BMS interface device may have access to all of the devices on a BMS network. In still further embodiments, the device list screen 710 may only show devices compatible with the BMS interface. The device list screen 710 may provide information about one or more devices on the BMS network such as device address, device name, device descriptions, and/or device labels. Device labels may indicate which devices are supported by the BMS network interface. The device labels may also indicate that a device is associated with a specific project associated with the BMS.

Figure 8:
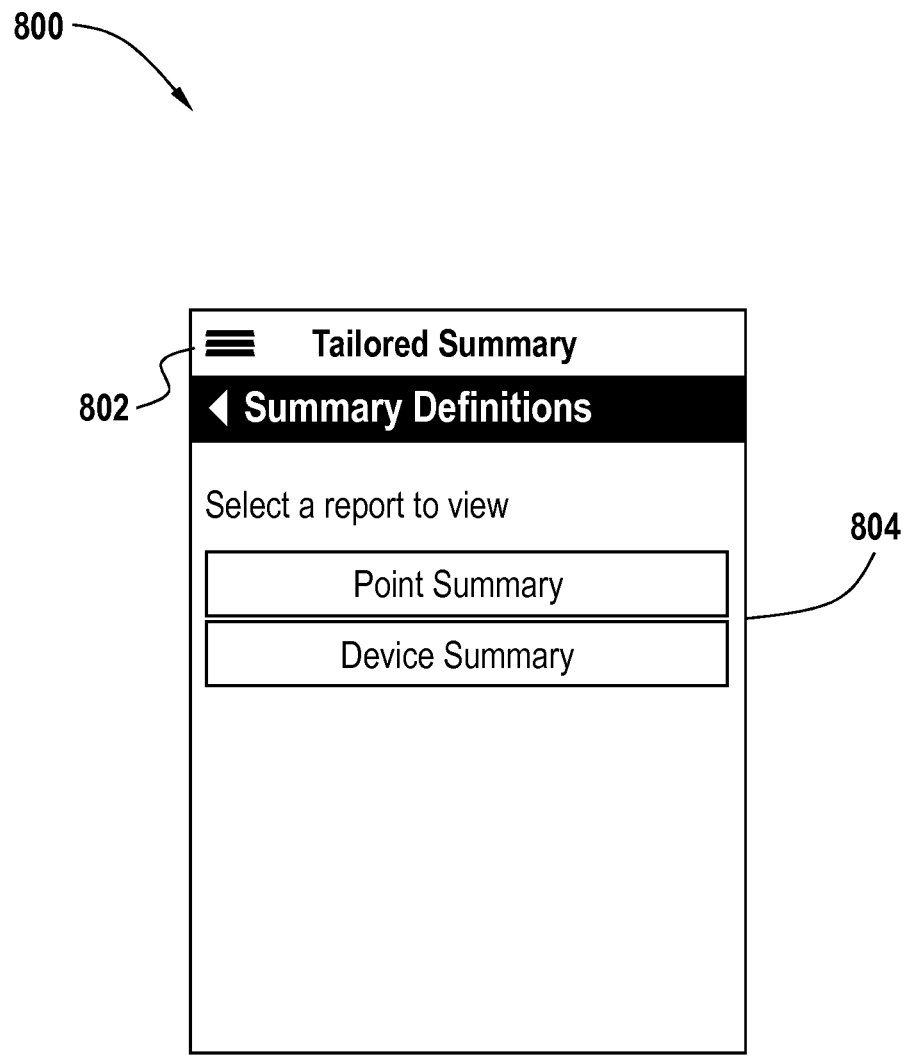
FIG. 8 is a screenshot illustrating a tailored view tool summary interface of the BMS interface device of FIG. 6, according to some embodiments.

Turning now to FIG. 8, a screenshot illustrating a tailored view tool summary interface 800 is shown, according to some embodiments. The tailored view tool summary interface 800 allows you to view and select defined summaries related to a BMS using the tailored view tool 610 described above. For example, a user may be able to use the tailored view tool 610, such that the tailored view tool summary interface 800 presents an overview of all devices that are part of a device list associated with BMS. Further, the tailored view tool 610 may allow a user to import a customized view from a user device. For example, a client may have one or more tools installed on a user device allowing the user to customize views in an "off-line" state.

The tailored view tool summary interface 800 can include a navigation bar menu 802, and one or more input devices 804, The navigation bar menu 802 can be used to navigate within the user interface 624. For example, the navigation bar menu 802 can be used to switch between views or tools within the user interface 624. The input devices 804 can be configured to allow a user select a report listed on a report list 806. In some embodiments, the report is a pre-generated file that includes points and/or attributes associated with the controllers and/or the points defined in the application which is being executed by the controller.

Figure 9:
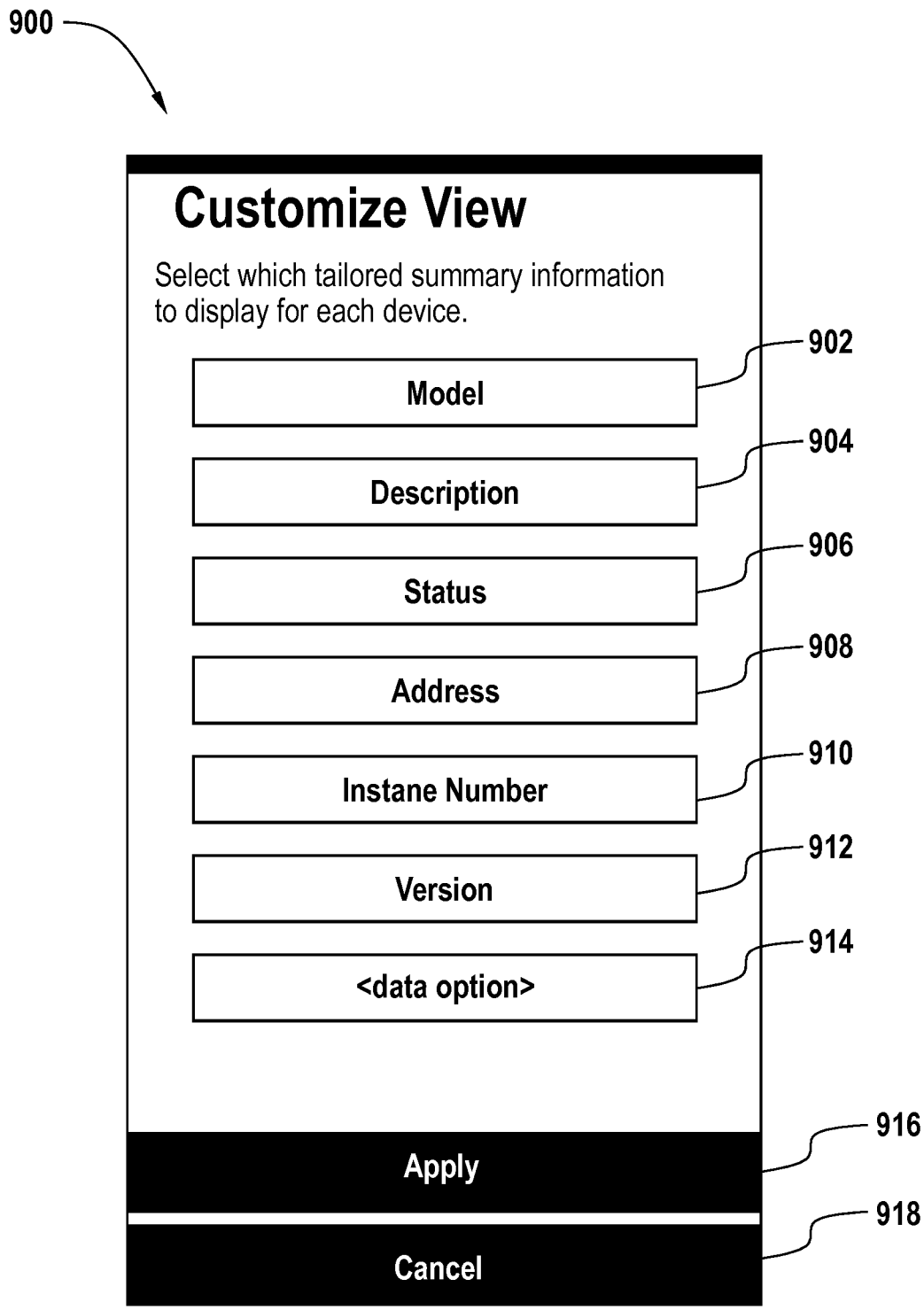
FIG. 9 is a screenshot illustrating a customized view interface of the BMS interface device of FIG. 6, according to some embodiments.

When a user selects one of the reports from the report list 806 using one of the input devices 804, the user interface 624 may present a customize view interface 900, as shown in FIG. 9. The customize view interface 900 may allow a user to modify a summary view associated with the user interface 624. For example, the user may be allowed to customize the view shown in FIG. 8 using the customize view interface 900. The customize view interface 900 may have a number of fields that the user can modify. In one embodiment, the customize view interface 900 includes a model field 902, a description field 904, a status field 906, an address field 908, and instance number field 910, a version field 912 and a data option field 914. The fields may be configurable so that a user can select one of the fields listed above, and modify one or more parameters associated with the selected field. For example, if a user selects the description field 904, a dialog box may be generated on the user interface 624 allowing a user to input a description associated with the customized view. In some embodiments, the field may provide a user with an option to select one or more options associated with the selected field. For example, if a user selects the status field 906, the user may be then be presented with the option to select from a list of statuses, such as "active" and "inactive." The customize view interface 900 may further include an apply input 916 and a cancel input 918. The apply input 916 may instruct the interface tools module 608 to implement the selected customization provided by the user via the customize view interface 900. The cancel input 918 may instruct the interface tools module 608 to disregard any proposed customization provided by the user.

Figure 10A:
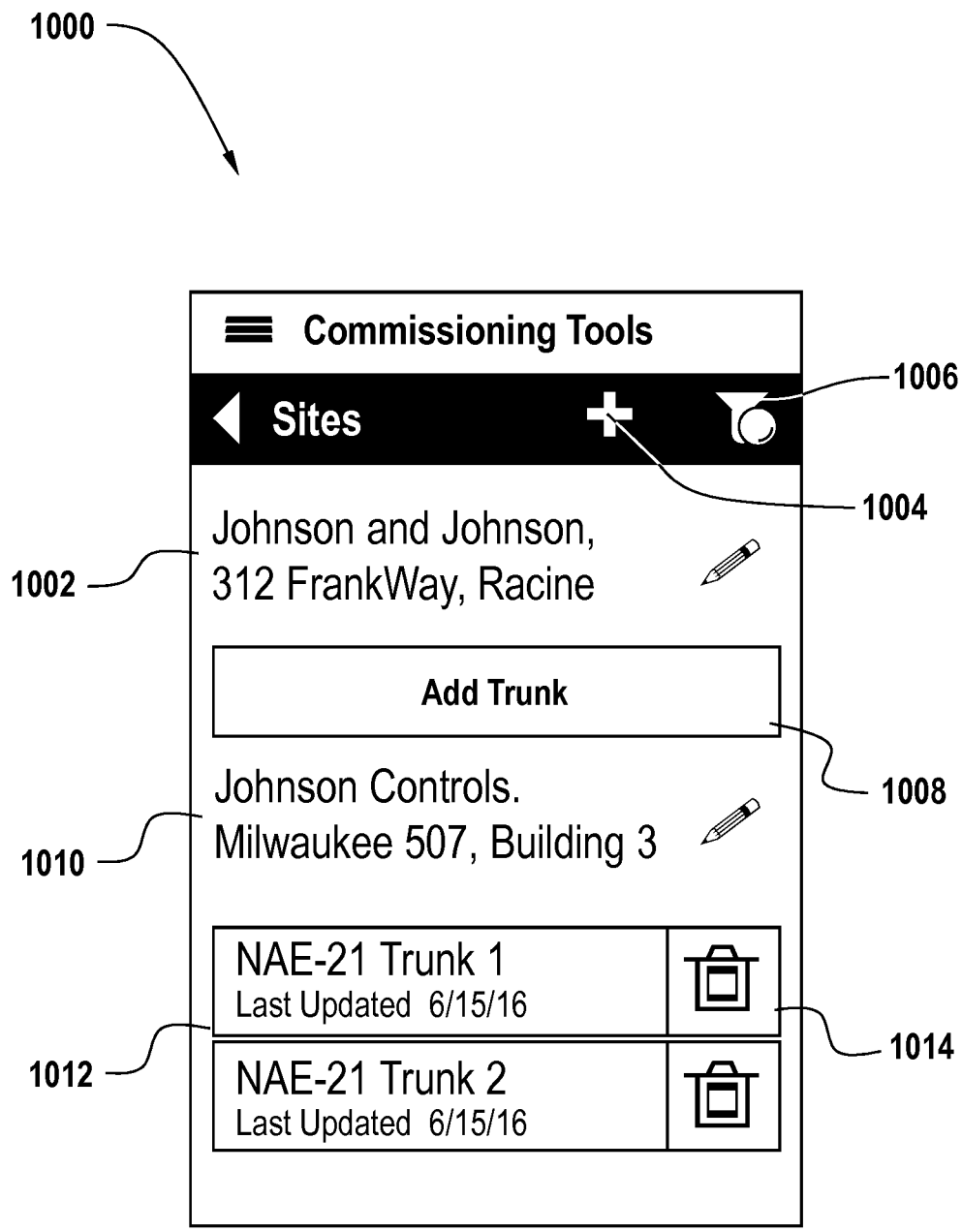
FIG. 10A is a screenshot illustrating a site summary interface of the BMS interface device of FIG. 6, according to some embodiments.

As described above, the BMS interface device 600 may also include a projects tool 612. The projects tool 612 can be used to create, select an existing, or modify a project associated with the BMS. In some embodiments, the BMS interface device 600 may be a portable device, which a user may take to various sites, to interface with various BMS's. Accordingly, the projects tool 612 can store projects associated with multiple sites (projects) in the memory 606 of the BMS interface device. For example, a user may be in the process of commissioning three different BMS facilities, and can store various parameters associated with each project in the BMS interface device 600. Turning now to FIG. 10A, a sites summary interface 1000 is shown, according to some embodiments. The sites summary interface 1000 may include an existing sites section 1002, a new site creation input 1004, a filter input 1006, an add trunk input 1008, a site summary interface 1010, and one or more trunk selection inputs 1012. The existing site section may list a selected site stored in the memory 606 of the BMS interface device 600. A user may be able to select one of the sites listed on home page 700 to bring up details about the project. The filter input 1006 may allow the user to filter the existing sites based on one or more filtering criteria, as will be described in more detail below. The add trunk input 1008 may be selected by a user to add one or more trunks to the selected site, as will be described in more detail below. The site summary interface 1010 may allow a user to see details relating to the trunks associated with one of the listed sites. The user may then select one or more of the trunk selection inputs 1012 to bring up additional details about a selected trunk. The user may further be able to delete one or more of the existing sites by selecting a delete input 1014 associated with each listed trunk.

Figure 10B:
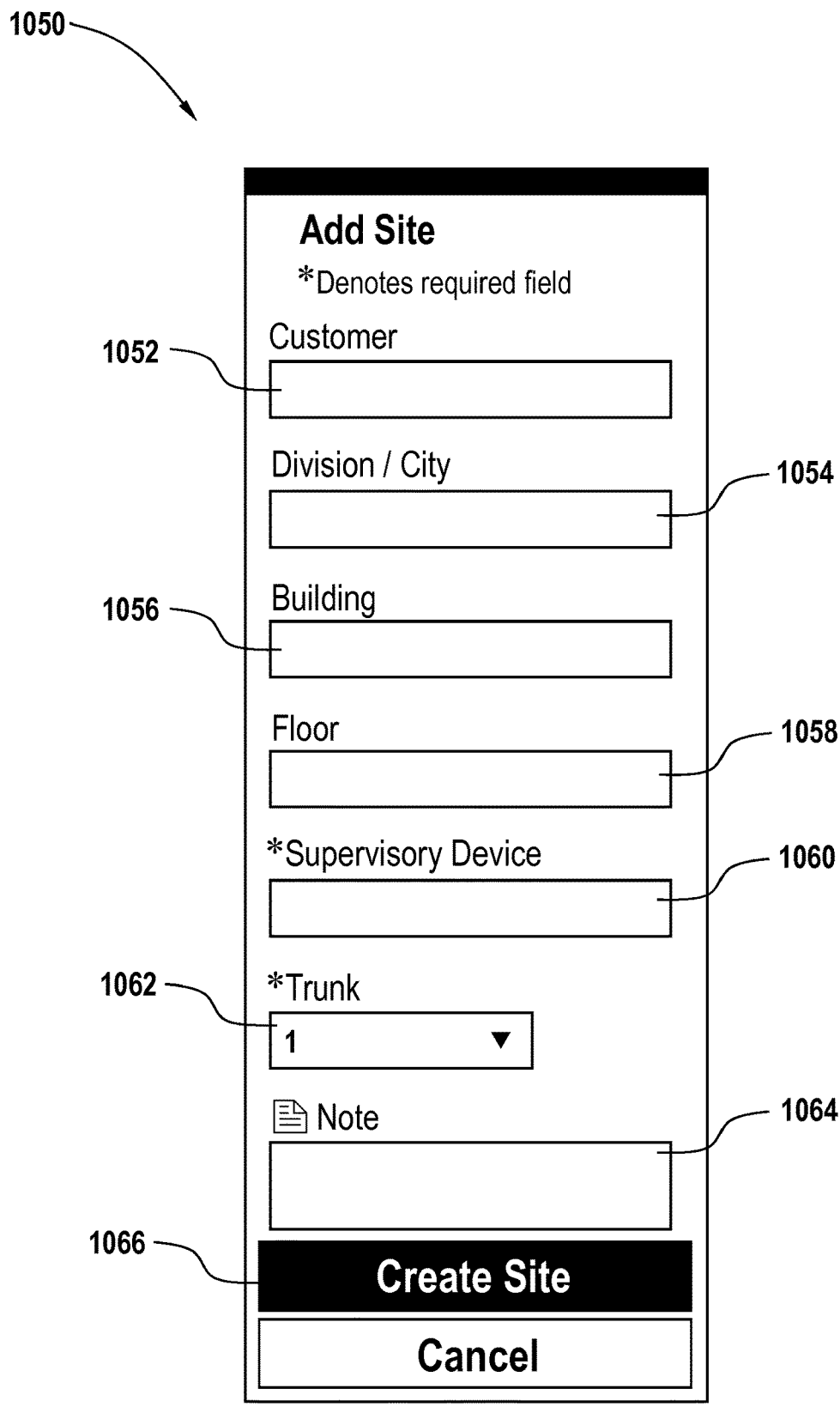
FIG. 10B is a screenshot illustrating an add site interface of the BMS interface device of FIG. 6, according to some embodiments.

FIG. 10B is a screenshot illustrating an add site interface 1050, according to some embodiments. The add site interface 1050 may be generated by a user selecting the new site creation input 1004. The add site interface 1050 may include a customer name field 1052, a division/city field 1054, a building field 1056, a floor number field 1058, a supervisory device field 1060, a trunk field 1062, a note field 1064, and a create site input 1066. The add site interface 1050 can allow a user to create a new project using the user interface 624. The customer name field 1052 can allow a user to input a customer associated with the site using the user interface 624, the division/city field 1054 can allow a user to enter a division and/or city associated with the site. The building field 1056 can allow a user to enter a building associated with the site. The floor number field 1058 can allow a user to select a floor associated with the site. The supervisory device field 1060 can allow a user to input a supervisory device associated with the site. The trunk field 1062 can allow a user to select a trunk number to be associated with the site. The note field 1064 can allow a user to input a note associated with the site. Finally, the create site input 1066 can allow the user to create a site based on the user provided inputs.

Figure 11:
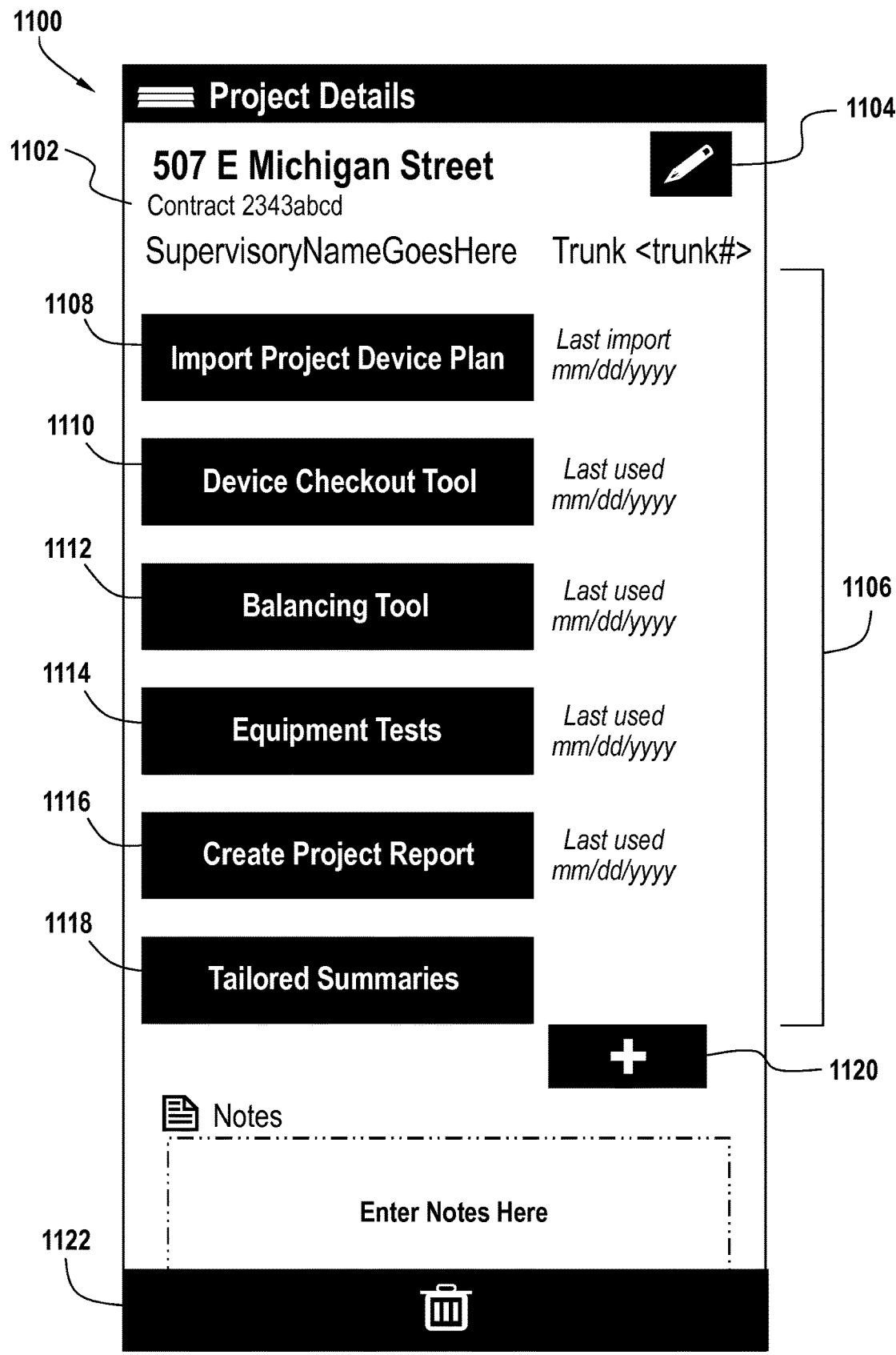
FIG. 11 is a screenshot illustrating a project details interface of the BMS interface device of FIG. 6, according to some embodiments.

Once the user has selected an existing site using the site summary interface 1000, or created a new site using the add site interface 1050, a project details interface 1100 can be presented to a user via the user interface 624, as shown in FIG. 11. The project details interface 1100 can provide general information about the project for existing projects. For example, the project details interface 1100 may have a project data portion 1102. The project data portion 1102 may display various aspects associated with the project, such as name, contract number, etc. The project data portion 1102 may further include an edit site input 1104. The edit site input 1104 can be used to active an edit project interface, which is described in more detail below. Further, the project details interface 1100 can provide access to tools associated with the project in the project action interface 1106. For example, the project action interface 1106 may include an import project device plan input 1108, a device checkout tool input 1110, a balancing tool input 1112, an equipment test input 1114, a create project report input 1116 and a tailored summaries input 1118. The import project device plan input 1108 may allow a user to import a list of devices that are to be listed in the project. The device checkout tool input 1110 can be used by a user to open a checkout tool dialog, as will be described in more detail below. The balancing tool input 1112 may be used by a user to open a balancing tool dialog, as described in more detail below. The equipment test input 1114 can be used to open an equipment dialog, as will be described in more detail below. The create project report input 1116 can be used to open a create project report dialog, as described in more detail below. The tailored summaries input 1118 can be used to open a tailored summaries dialog, as described above. The project details interface 1100 may further include an add note input 1120 for adding additional notes to the project. Finally, the project details interface 1100 may have a delete input 1122 which may be used to delete the selected project.

Figure 12A:
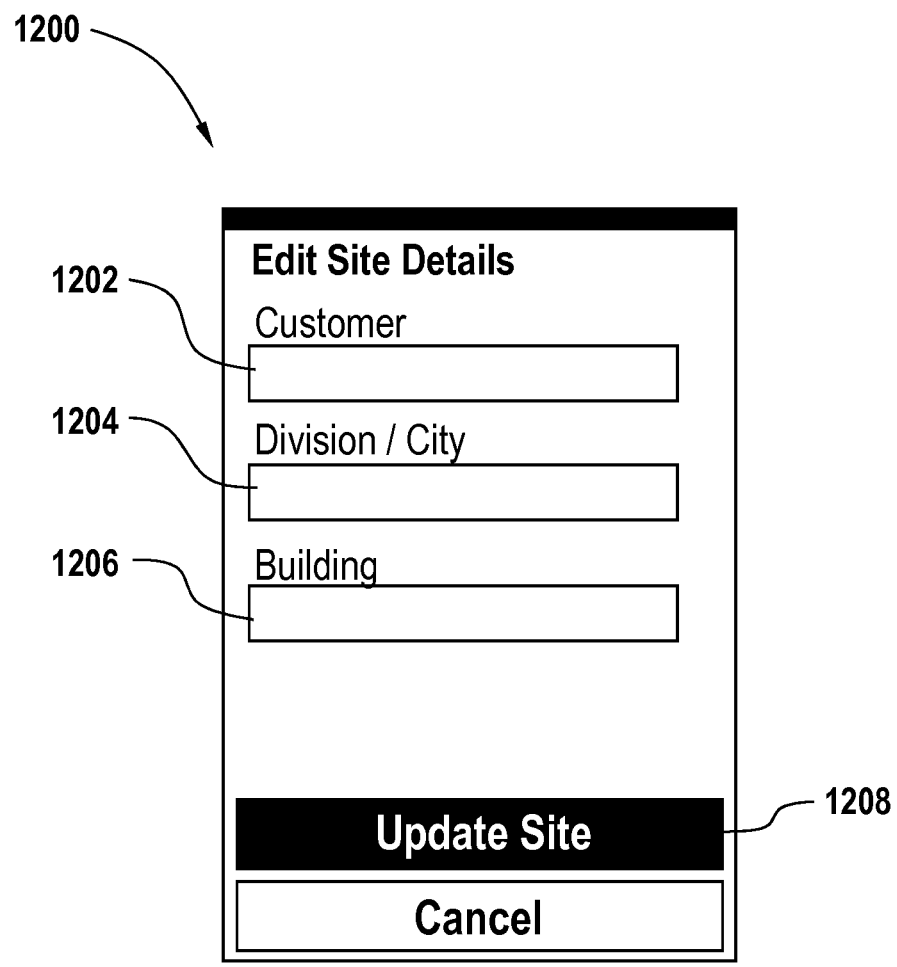
FIG. 12A is a screenshot illustrating an edit site interface of the BMS interface device of FIG. 6, according to some embodiments.

Turning now to FIG. 12A, an edit site interface 1200 is shown, according to some embodiments. In one embodiment, the edit site interface 1200 may be generated by the user interface 624 when a user selects the edit site input 1104, as shown in FIG. 11. The edit site interface 1200 may include a customer name field 1202, a division/city field 1204, a building field 1206, and an update site input 1208. The edit site interface 1200 can allow a user to edit a site using the user interface 624. The customer name field 1202 can allow a user to input a customer associated with the site using the user interface 624, the division/city field 1204 can allow a user to enter a division and/or city associated with the site. The building field 1206 can allow a user to enter a building associated with the site. Finally, the update site input 1208 can allow the user to update a selected site based on the user provided inputs.

Figure 12B:
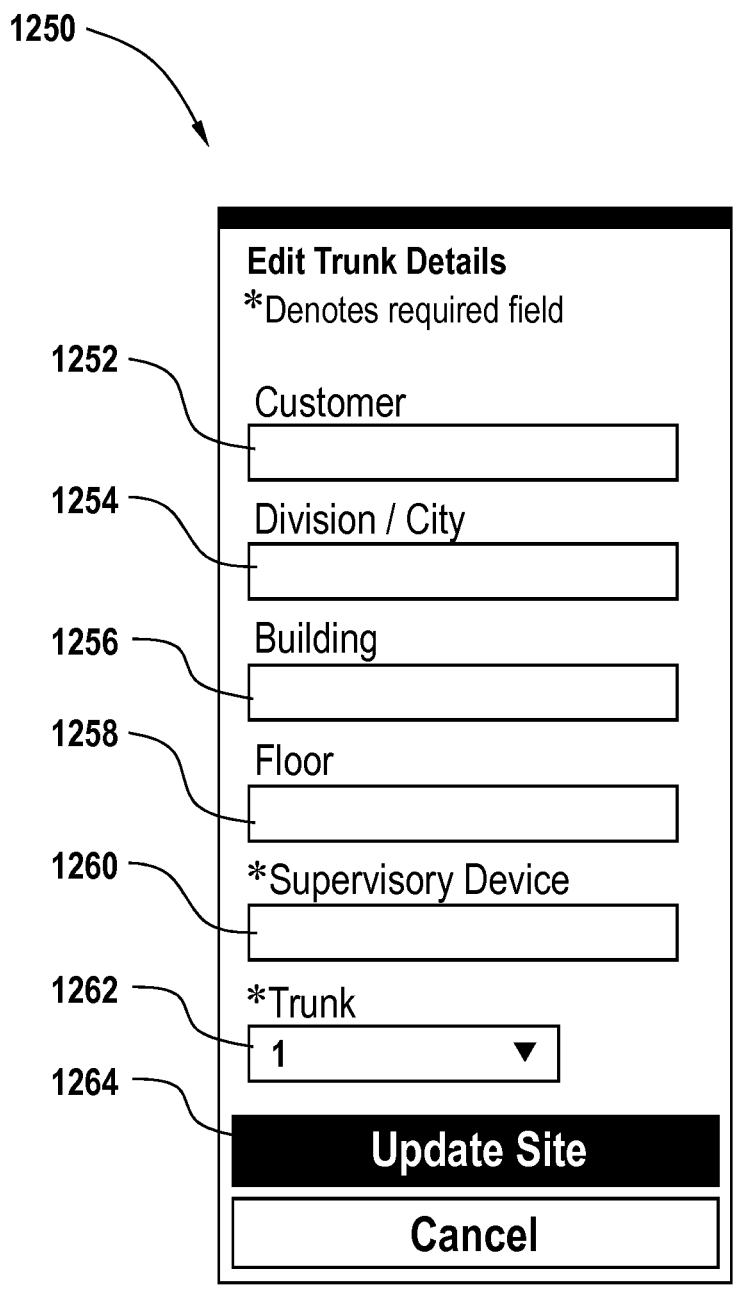
FIG. 12B is a screenshot illustrating an edit trunk details interface of the BMS interface device of FIG. 6, according to some embodiments.

Turning now to FIG. 12B, an edit trunk details interface 1250 is shown, according to some embodiments. The edit trunk details interface 1250 may be generated by the user interface 624 when the user selects one or more of the trunk selection inputs 1012. The edit trunk details interface 1250 may include a customer name field 1252, a division/city field 1254, a building field 1256, a floor field 1258, a supervisory device field 1260, a trunk selection field 1262, and an update trunk input 1264. The customer name field 1252 can allow a user to enter a customer name associated with the selected trunk. The division/city field 1254 can allow a user to enter a division or city associated with the selected trunk. The building field 1256 can allow a user to enter a building associated with the selected trunk. The floor field 1258 can allow a user to enter a floor associated with the selected trunk. The supervisory device field 1260 can allow a user to input a supervisory device associated with the selected trunk. The trunk selection field 1262 can allow a user to assign a trunk number to the selected trunk. Finally, the update trunk input 1264 allows a user to update the selected trunk with the values input as described above.

Figure 13:
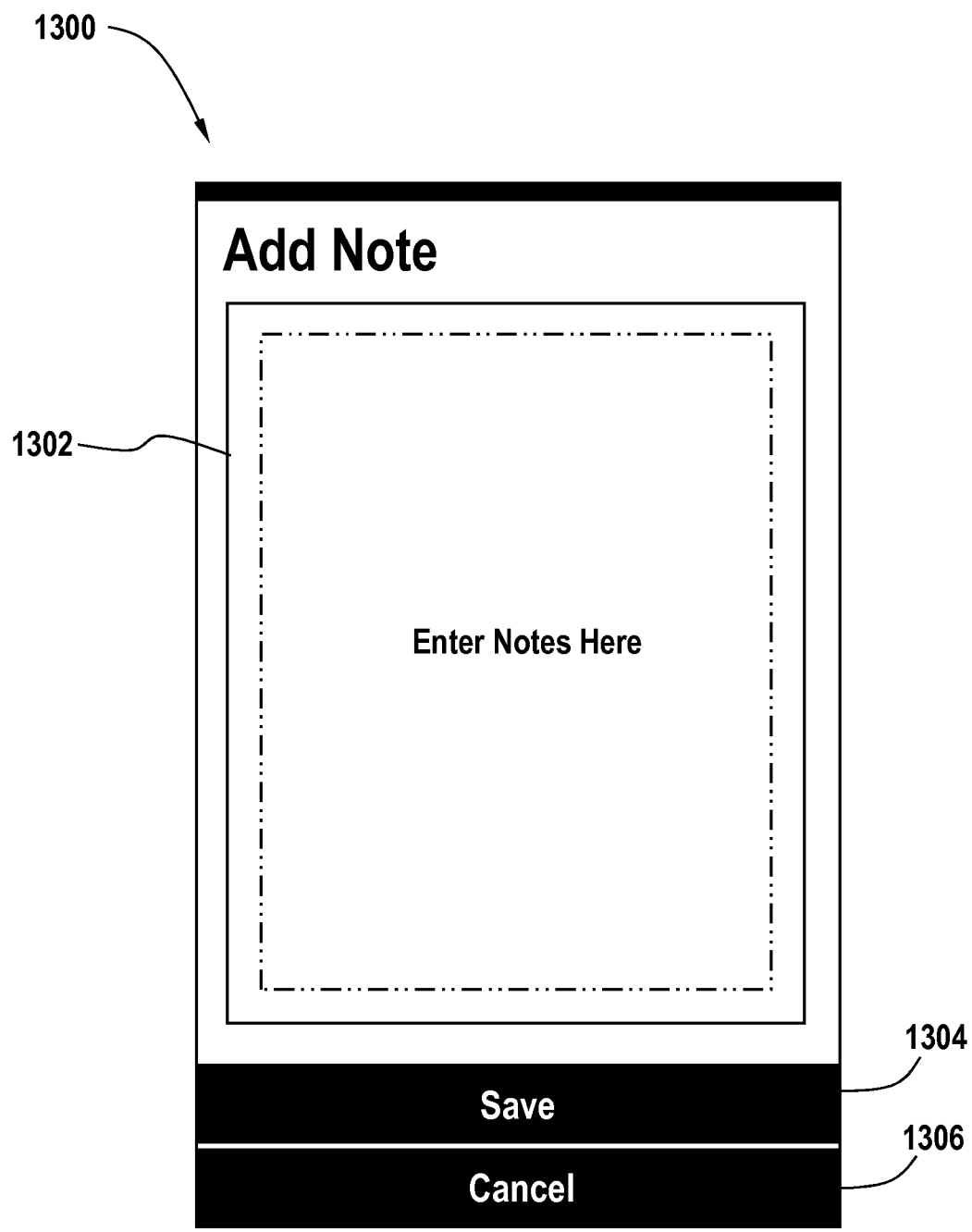
FIG. 13 is a screenshot illustrating an Add Note interface of the BMS interface device of FIG. 6, according to some embodiments.

Turning now to FIG. 13, an Add Note interface 1300 is shown. In one embodiment, the Add Note interface 1300 may be generated by the user interface 624 when a user selects the add note input 1120, as shown in FIG. 11. The Add Note interface 1300 may include a note text dialog input 1302. A user may input a textual note into the Add Note interface 1300 using the note text dialog input 1302. The Add Note interface 1300 may further include a save note input 1304 and a cancel input 1306. The save note input 1304 may be selected by a user after the user has input the note using the user interface 624, and will instruct the BMS interface device 600 to save the note. The cancel input 1306 may be selected by a user to instruct the BMS interface device 600 to not save any notes created by the user using the Add Note interface 1300.

Figure 14:
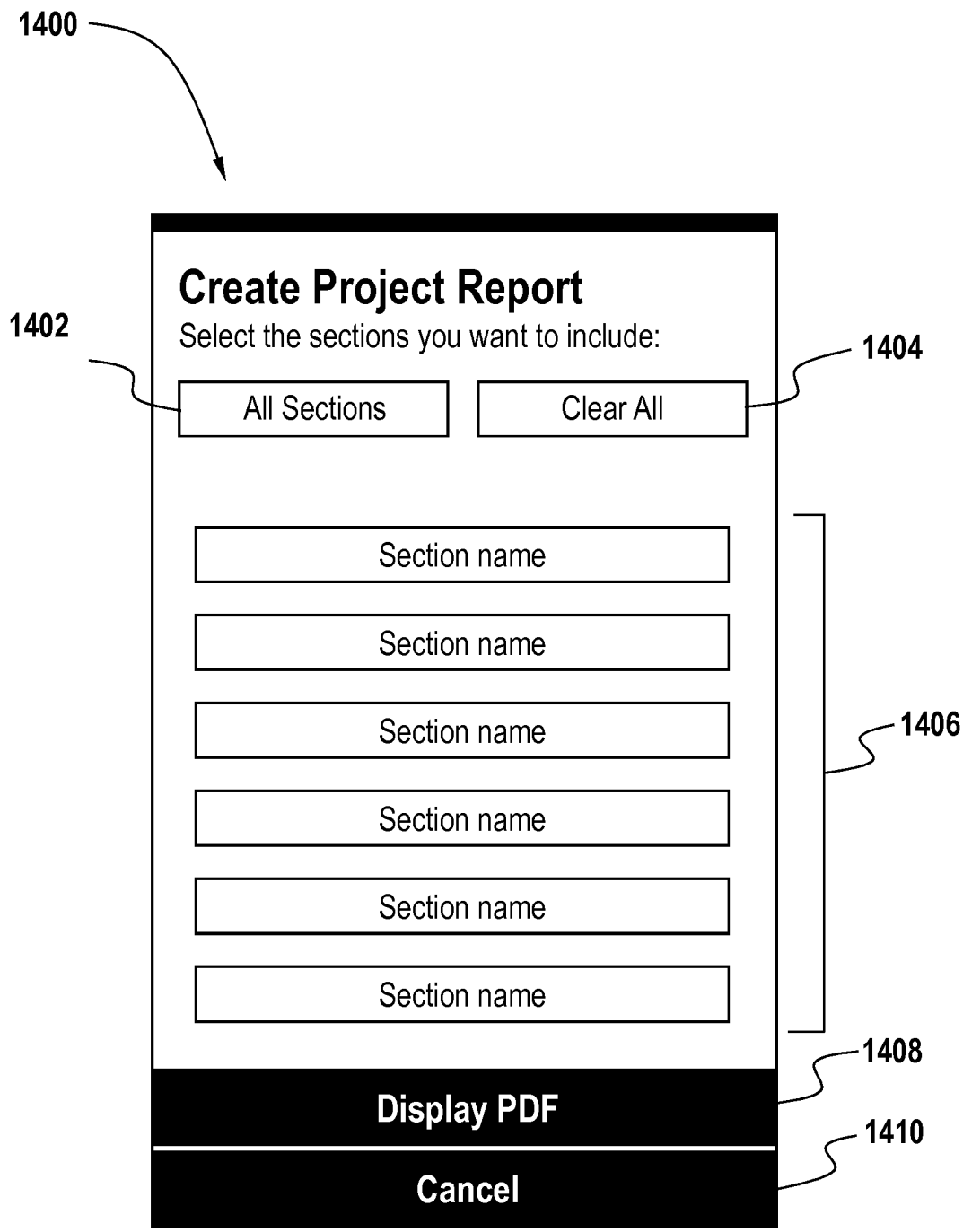
FIG. 14 is a screenshot illustrating a create project report interface of the BMS interface device of FIG. 6, according to some embodiments.

Turning now to FIG. 14, a create project report interface 1400 is shown. The create project report interface 1400 may be used to create a custom report associated with a given project. A project report may include project data, including device data, test results, status of devices, etc. The create project report interface 1400 may include a select all sections input 1402 and a clear all input 1404. The select all sections input 1402 may allow a user to instruct the BMS interface device 600 to select all sections associated with a given project to be imported into a generated report. The sections may include project information, controller summary, test points, balancing, equipment, and trends. However, in some embodiments, more or fewer sections may be available for selection into the report. The create project report interface 1400 may further include an individual section selection interface 1406. The individual section selection interface 1406 may allow a user to select individual sections of the report, such as those sections described above. The create project report interface 1400 may further include a display report input 1408 and a cancel input 1410. The display report input 1408 may be used to instruct the BMS interface device 600 to generate the selected report. In one embodiment, the report is generated in the form of a portable document format (PDF) document. However, in other examples the report may be generated in other formats. The cancel input 1410 may be used to cancel the create project request.

Figure 15:
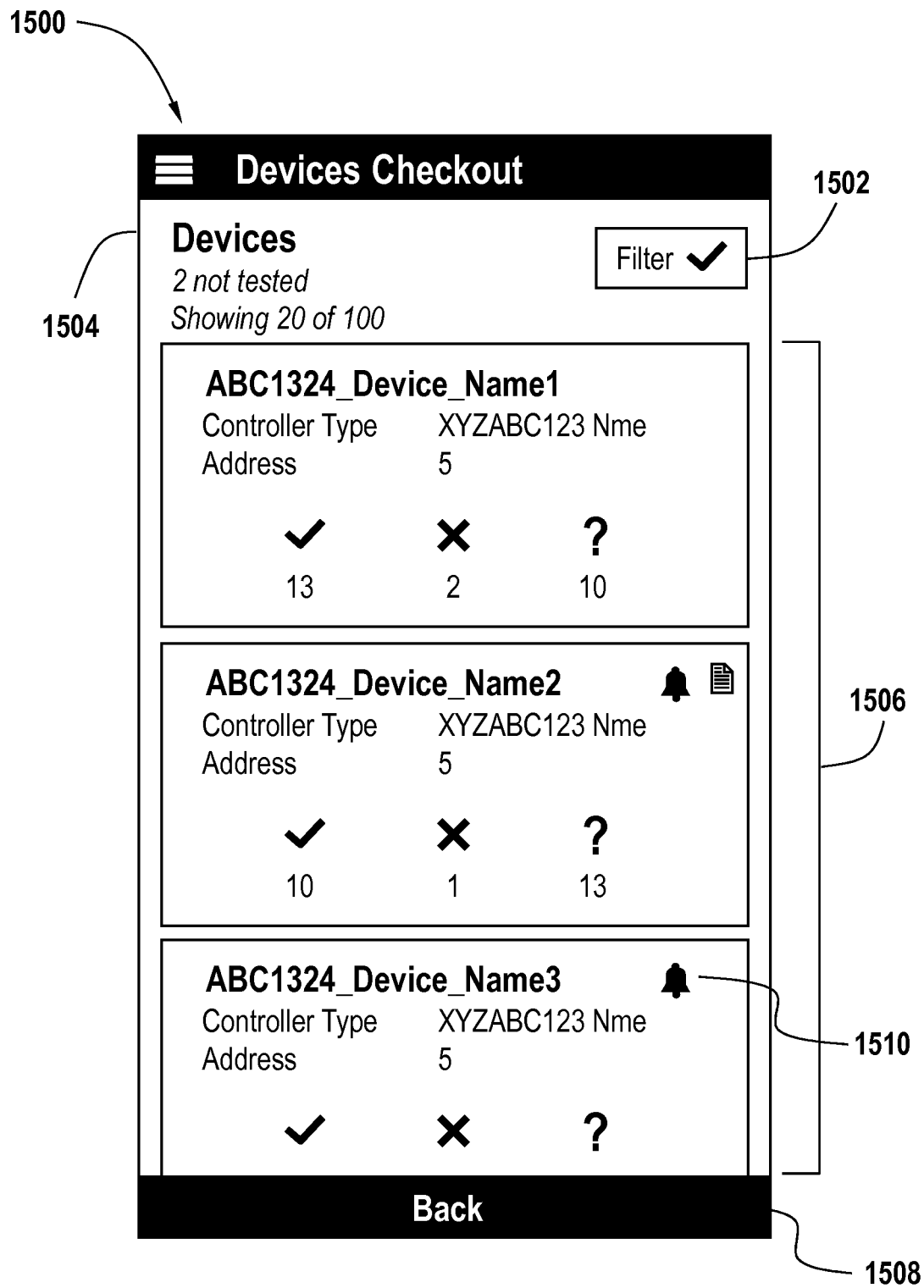
FIG. 15 is a screenshot illustrating a device checkout summary interface of the BMS interface device of FIG. 6, according to some embodiments.

As described in FIG. 6, the BMS interface device 600 may further include a device checkout tool 613. The device checkout tool 613 may be configured to present data related to one or more devices (e.g. field devices and controllers) within the BMS to a user. For example, a user may be able to get a list of devices that are selected to work on (e.g. commission) using the device checkout tool 613. In some embodiments, the device checkout tool 613 may present a list of all devices in a BMS to a user, and allow a user to filter the results to locate the devices that the user is interested in. Further, device information such as status and other attribute information may be provided to a user using the device checkout tool 613. Turning now to FIG. 15, a device checkout summary interface 1500 is shown, according to some embodiments. The device checkout summary interface 1500 may include a filter input 1502, a devices summary 1504, one or more device interfaces 1506, and a navigation input 1508. The filter input 1502 may bring up a filter interface that allows the user to filter the listed devices such that only those devices meeting certain criteria are displayed. The filter interface will be described in more detail below. The devices summary 1504 can provide a user with a summary of how many devices are listed, as well as how many devices have not been tested. Testing a device may include querying a device to obtain certain parameters therefrom. In one example, a device may not be tested where the device is a third party device (e.g. a device not associated with the BMS interface device 600). In other examples, a device may not be tested where there is a communication failure between the BMS and one or more of the devices.

The device interfaces 1506 may provide summary data regarding each listed device. For example, the device interfaces 1506 may include data such as device name, controller type, address, and point information. Point information can include an indication of which points have been tested and determined to be ok (indicated by checkmark), which points have failed the test (indicated by an "X") and which points remain untested (indicated by a "?"). In one embodiments, points refer to inputs and outputs associated with the device. Further, in some embodiments, the device interfaces 1506 may include an alarm indication 1510 indicating that an alarm was generated associated with the listed device. A note icon 1512 may also be presented within the device interfaces 1506, indicating that a note is associated with the device. The navigation input 1508 may be used to navigate to a different interface associated with the user interface 624.

Figure 16:
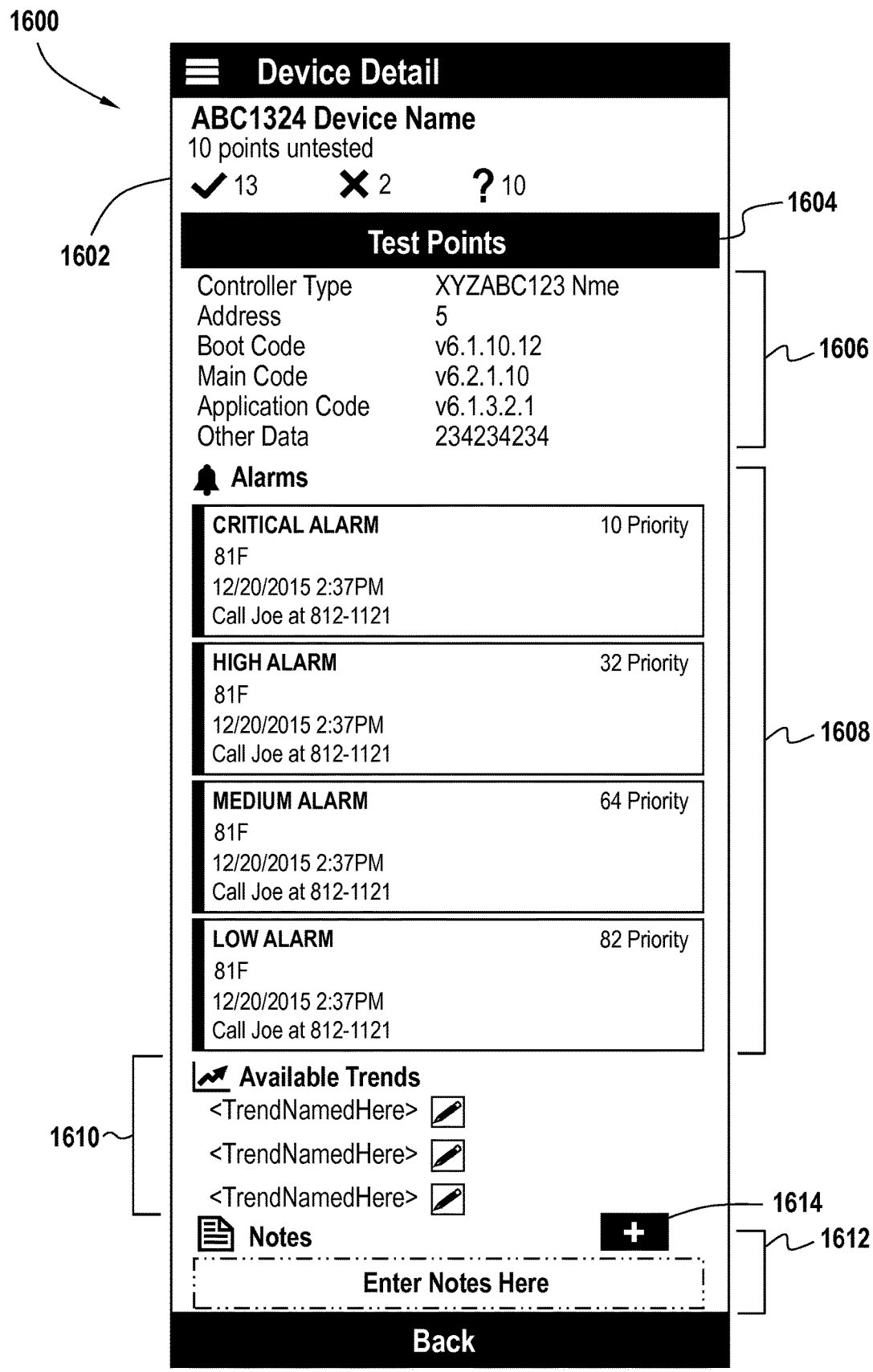
FIG. 16 is a screenshot illustrating a device details interface of the BMS interface device of FIG. 6, according to some embodiments.

In one embodiment, a user may be able to select one of the device interfaces 1506 to access additional data related to the selected device. Turning now to FIG. 16, a device details interface 1600 is shown according to some embodiments. The device details interface 1600 may be generated when a user selects one of the listed devices from the device interfaces 1506. The device details interface 1600 may include a device summary section 1602, a test points input 1604, a device details sections 1606, an alarms section 1608, a trends section 1610, and a notes section 1612. The notes section 1612 can include an add note input 1614. The device summary section 1602 can include basic information about the device, such as the device name, as well as the status of the points associated with the device. The test points input 1604 can instruct the BMS interface device 600 to test the points associated with each device. To test the points, the BMS interface device 600 may send a command to a device over the BMS network to instruct the device to perform a diagnostic on the points. The device may then execute the test, and provide feedback to the BMS interface device 600, which can then be displayed in the device summary section 1602.

The device details section 1606 may present data relating to the selected device. For example, the device details section 1606 may include data such as controller type, address, boot code version, main code version, application code version, and other data associated with the device. In some embodiments, a user may customize what device information is presented. For example, a user may customize the device information presented when the BMS interface device 600 is customized. The alarms section 1608 may present all alarms associated with the selected device. Each listed alarm may contain alarm data, such as the alarm type, alarm significance, alarm time, alarm priority, and/or any notes associated with the alarm. The alarm type can be the specific alarm associated with each device. For example, alarm types can include over temperature alarms, level alarms, over voltage alarms, over current alarms, or any other alarms associated with the devices. The alarm significance may define the level of criticality of the alarms, such as critical, high, medium and low level alarms. Alarm priority may state what the priority the alarm is. The trends section 1610 can allow a user to select one or more trends associated with the selected device. Selecting one or more of the listed trends in the trends section 1610 can allow a user to view a trend associated with the selected device, as will be described in more detail below. The notes section 1612 may include any notes related to the selected device. The add note input 1614 can be used to allow a user to add another note to be associated with the device.

Figure 17:
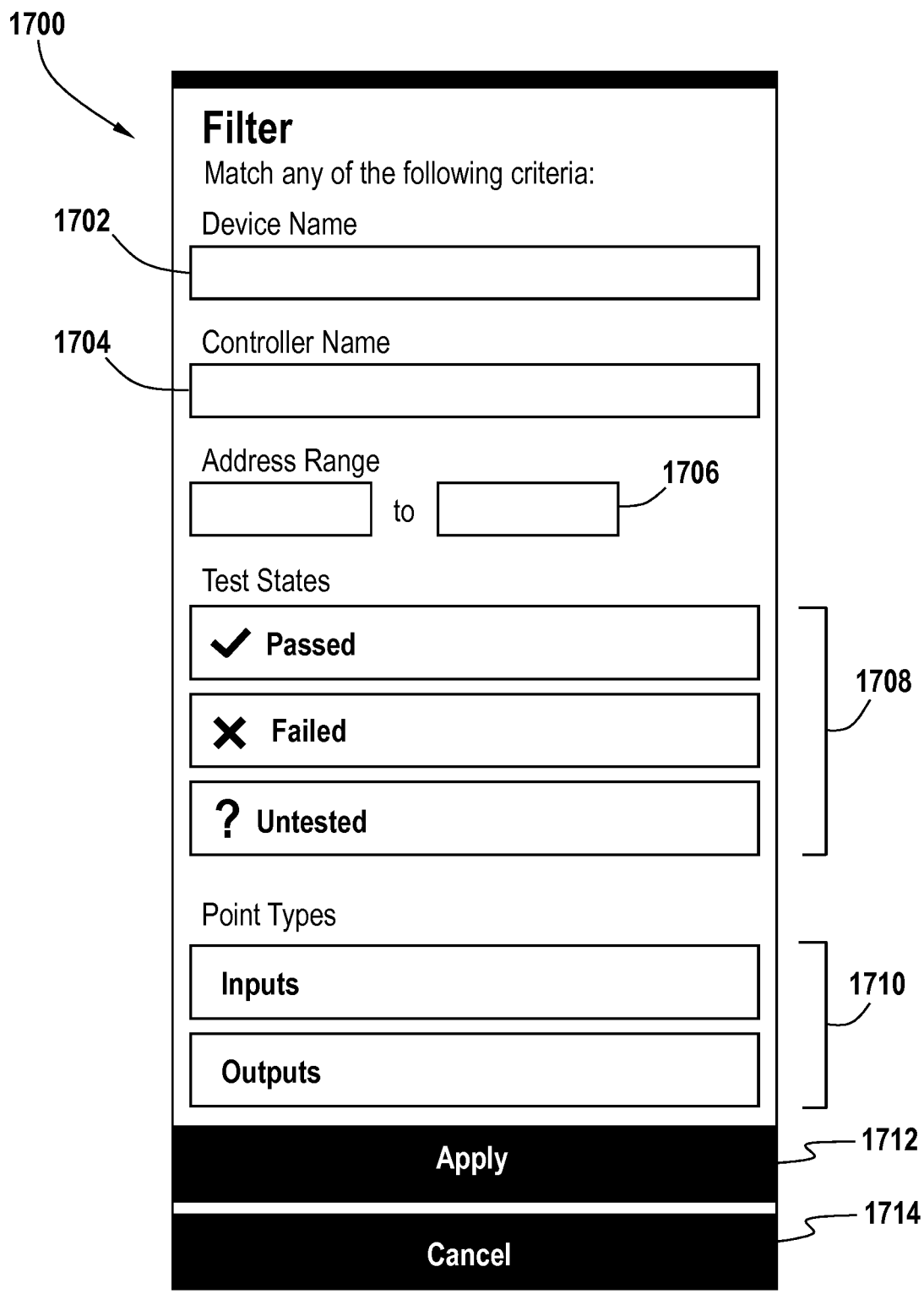
FIG. 17 is a screenshot illustrating a device list filter interface of the BMS interface device of FIG. 6, according to some embodiments.

Turning now to FIG. 17, a device list filter interface 1700 is shown, according to some embodiments. The device list filter interface 1700 may be used to filter the devices listed in the device checkout summary interface 1500 described above. The device list filter interface 1700 may allow a user to filter the devices based on multiple parameters. For example, a user may filter the devices by a device name via a device name dialog 1702. In one embodiment, the device name dialog 1702 is a free form dialog box allowing for a user to input the desired device name by entering text. The BMS interface device 600 may then filter the results based on the controller name provided by the user. In other examples, a user may be able to filter the devices by a controller name using a controller name dialog 1704. In one embodiment, the controller name dialog 1704 is a free form dialog box allowing for a user to input a controller name by entering text. The BMS interface device 600 may then filter the results based on the controller name provided by the user. In other examples, the user may filter the devices based on an address range using an address range dialog 1706. In one embodiment, the address range dialog 1706 may have two separate free form text dialog boxes allowing a user to input a first address value and a second address value. The BMS interface device 600 may then filter the devices by only listing devices having an address range between the first address value and the second address value.

In further examples, the user may filter the device based on the point states using a point test state interface 1708. The point test state interface 1708 may include options for a user to select point test state values. For example, the point test state interface 1708 may allow a user to select one or more test state filter parameters, including "passed," "failed," and "untested." The BMS interface device 600 may then filter the results based on the point test state parameters selected by the user. In further examples, the user may be able to filter the devices based on the point types of the devices using a point type interface 1710. The point type interface 1710 may include options for a user to select one or more point types parameters, such as "input," and/or "output." The BMS interface device 600 may then filter the results based on the point type parameters selected by the user. In some embodiments, the user may use a combination of the above filter types to filter the devices. The device list filter interface 1700 may further include an "apply" input 1712 and a "cancel" input 1714. The apply input 1712 may be used to apply the filters selected by the user. The cancel input 1714 is used to disregard any filters selected by the user.

Figure 18:
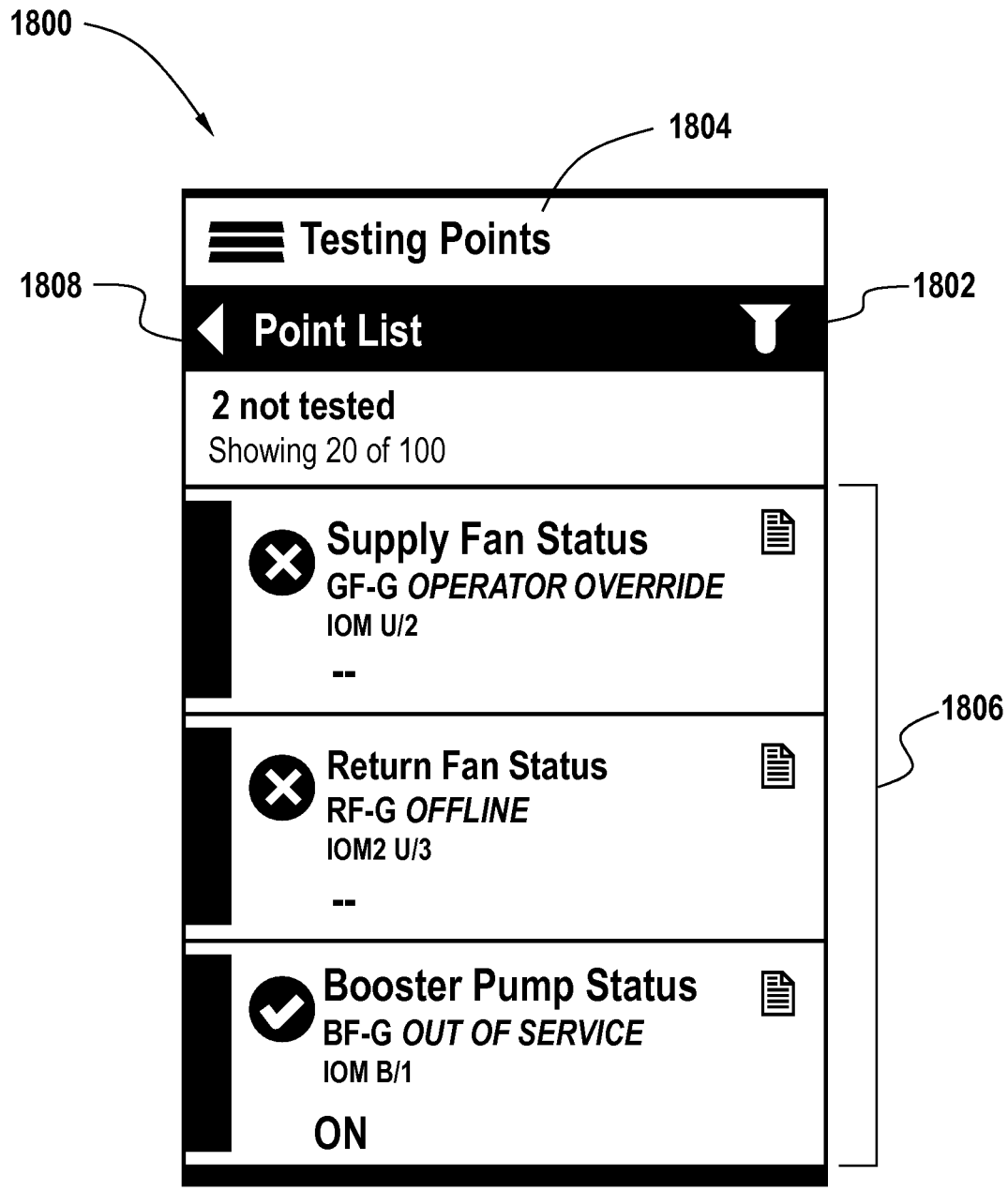
FIG. 18 is a screenshot illustrating a testing point interface of the BMS interface device of FIG. 6, according to some embodiments.

Turning now to FIG. 18, a testing points interface 1800 is shown, according to some embodiments. In one embodiment, the testing points interface 1800 provides a user with all of the points in the BMS. Further, the testing points interface 1800 may be used to provide a user with a list of points to check based on a device type, filter the points to reduce the list of points presented, to see how many of the points are not tested for a selected device, and to select a point to test. Further, the testing points interface 1800 may allow a user to open and read a note if a note has been associated with the point. The testing points interface 1800 may have a filter input 1802 to allow a user to filter the points. In one embodiment, selection of the filter input may bring up a point filter interface, as will be described below.

The testing points interface 1800 may further have a points list 1804. The points list 1804 can list all of the points in the BMS, or all the points that the BMS interface device 600 has access to. The points list 1804 can present information of each point, including a testing status, a point value, and or whether a note is associated with the point. Points values can be any type of value, such as integer values, float values, or binary values (e.g. "on" or "off"). In some embodiments, the points list 1804 can provide a long names, or short names associated with the points. Further, the points list 1804 may display additional information about the points, including an associated building name or other point information. A user may be able to select one of the points within the points list 1804 to obtain more information about the point. In some embodiments, the points list 1804 can color code each listed point to indicate a status of the point. For example, red could indicate that the point is faulted, while green could indicate that the point is operating correctly. Finally, the testing points interface 1800 may include a navigation input 1806 to allow a user to return to the previous interface of the user interface 624.

Figure 19:
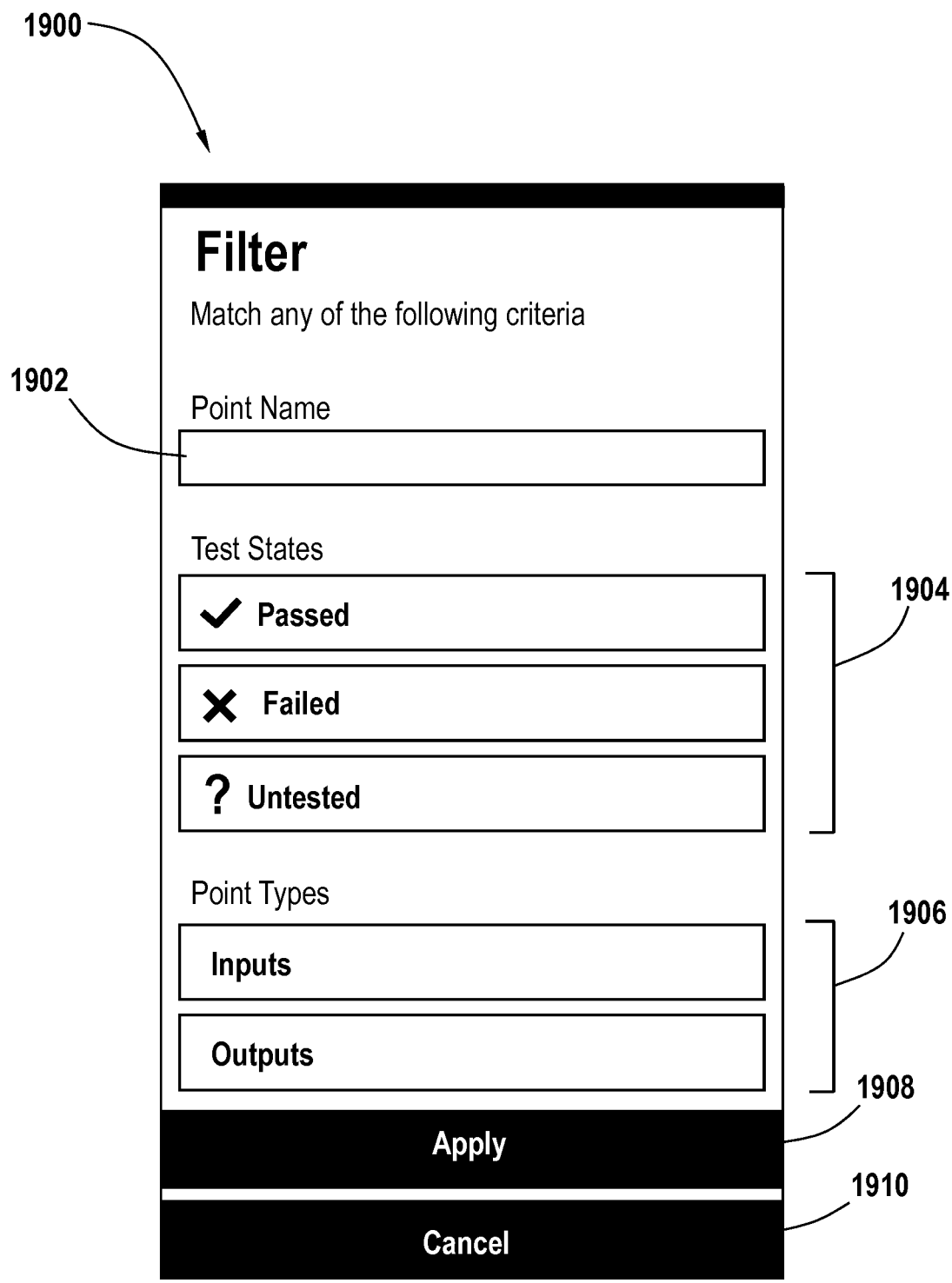
FIG. 19 is a screenshot illustrating a point filter interface of the BMS interface device of FIG. 6, according to some embodiments.

Turning now to FIG. 19, a point filter interface 1900 is shown, according to some embodiments. The point filter interface 1900 may be configured to allow a user to filter the points presented in the testing points interface 1800. In one embodiment, a user may filter the points based on the point names using the point name filter dialog 1902. The point name filter dialog 1902 may be a free form text dialog allowing a user to enter the name of the point they wish to filter for. The BMS interface device 600 may then filter the points based on the point name provided by the user. In further examples, the user may filter the points based on the point test state of the points using a point state interface 1904. The point state interface 1904 may include options for a user to select one or more point state parameters, such as "passed," "failed" and/or "untested." The BMS interface device 600 may then filter the results based on the point state parameters selected by the user. In further examples, the user may be able to filter the points based on the point types of the points using a point type interface 1906. The point type interface 1906 may include options for a user to select one or more point types parameters, such as "input," and/or "output." The BMS interface device 600 may then filter the results based on the point type parameters selected by the user. The points filter interface may further include an "apply" input 1908 and a "cancel" input 1910. The apply input 1908 may be used to apply the filters selected by the user. The cancel input 1910 is used to disregard any filters selected by the user.

Figure 20:
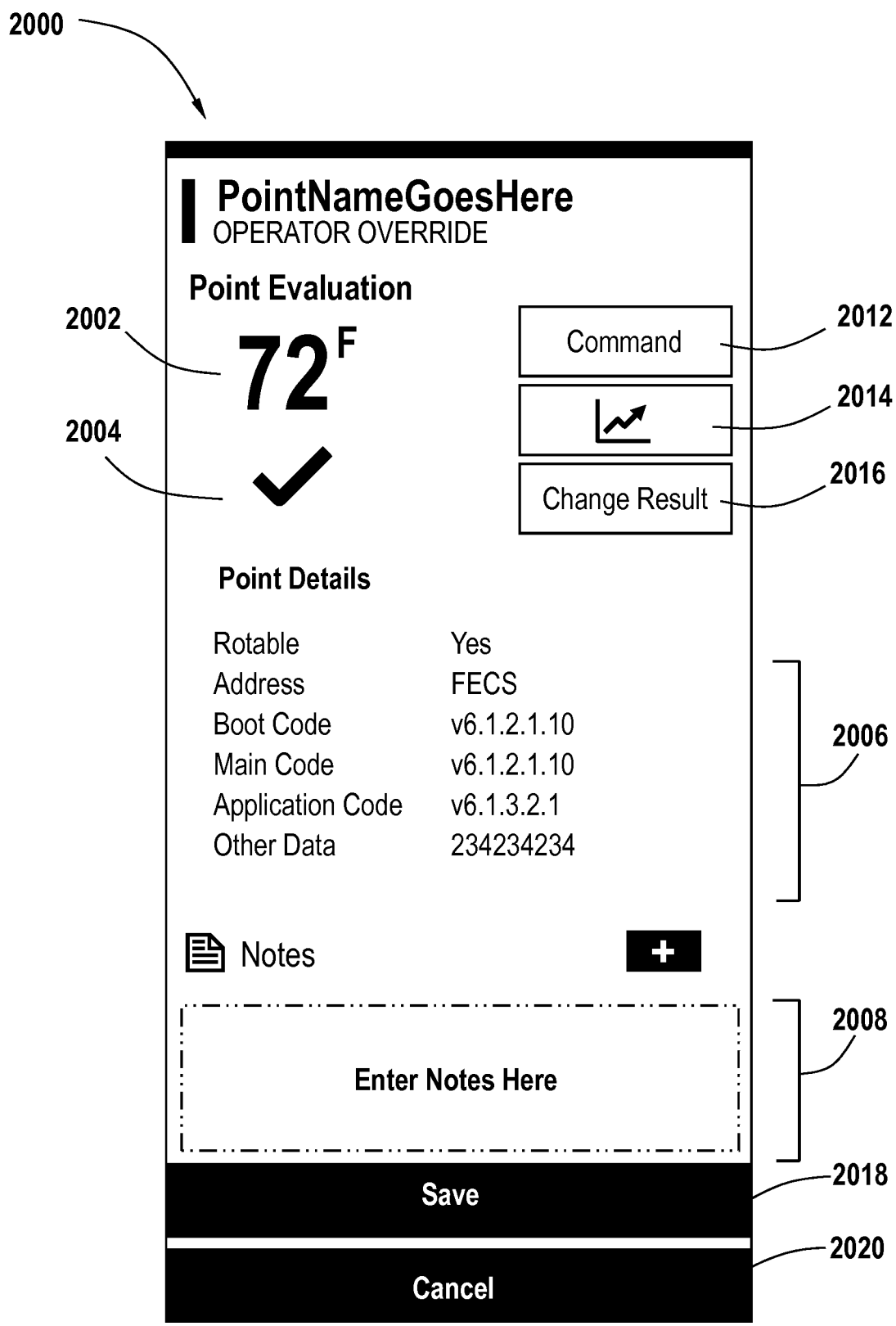
FIG. 20 is a screenshot illustrating a detailed point interface of the BMS interface device of FIG. 6, according to some embodiments.

Turning now to FIG. 20, a detailed point interface 2000 is shown, according to some embodiments. The detailed point interface 2000 may be configured to provide detailed information about a point selected by the user using the testing points interface 1800. The detailed point interface 2000 may include a point value section 2002. The point value section 2002 may include a value associated with point. For example, the point value section 2002 may provide a point value such as a temperature. However, other point values are also contemplated, such as voltages, currents, flow rates, pressure, or binary signals (on/off). The detailed point interface 2000 may further include a point test status indicator 2004. For example, the point test status indicator 2004 may indicate whether a point has passed a test, failed a test or has yet to be tested. The detailed point interface 2000 further includes a detailed point data section 2006, the detailed point data section 2006 can include data related to the point such as whether the point is reliable, the address of the point, the boot code version of the device associated with the point, the main code version of the device associated with the point, the application code version of the device associated with the point, as well as other data. The detailed point interface 2000 may further include a notes section 2008. The notes section 2008 may include notes associated with the point. Further, the notes section 2008 may further include an add note input 2010 to allow for a user to input an additional note associated with the point.

The detailed point interface 2000 may further include a command input 2012, a trend generation input 2014 and a change result input 2016. The command input 2012 can be used to open a command dialog interface, which will be discussed in more detail below. The trend generation input 2014 can be used to open a trend generation dialog interface, which will be described in more detail below. The change result input 2016 can be used to open a change result dialog interface, which will be described in more detail below. The detailed point interface 2000 may further include a save input 2018 and a cancel input 2020. The save input 2018 can save any changes or modifications made by the user. The cancel input 2020 is used to disregard any filters selected by the user.

Figure 21:
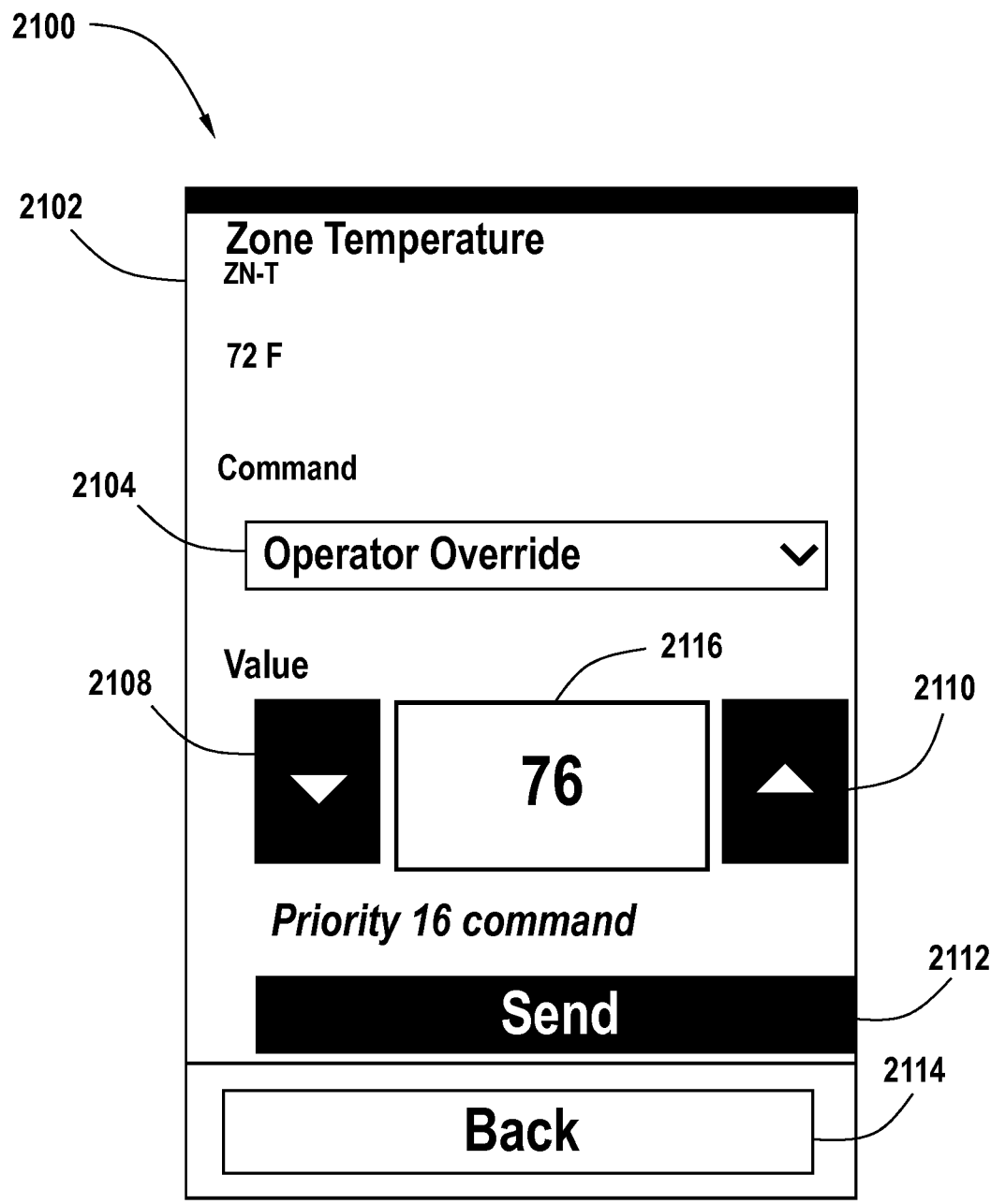
FIG. 21 is a screenshot illustrating a command dialog interface of the BMS interface device of FIG. 6, according to some embodiments.

Turning now to FIG. 21, a command dialog interface 2100 is shown, according to some embodiments. The command dialog interface 2100 may include a point summary section 2102. The point summary section 2102 may display basic data related to the point, such as the point name, a point value, and a current point status. The command dialog interface 2100 may further include a command selection interface 2104. The command selection interface 2104 may allow a user to select one or more commands from a pre-populated list of commands. The pre-populated list of commands can include an adjust command, an operator override command, a release operator override command, an in service command, and an out of service command. However, other commands are contemplated. In one example operator override command may allow a user to override the current set value of the point. The user, wishing to increase the temperature of a room, may select the point associated with the room temperature, and use the operator override command to allow for the user to input a desired point value. In some embodiments, the user may be able to input the desired point value using a point data value input dialog 2106. The point data value input dialog 2106 can allow a user to input an exact data point value into the command dialog interface 2100. In other embodiments, the user may be able to modify the point data value by using a decrease point data value input 2108 and/or an increase point data value input 2110. The decrease point data value input 2108 may be used to decrease the current point data value. Conversely, the increase point data value input 2110 may be used to increase the current point data value. In some examples, a single actuation of the decrease point data value input 2108 or the increase point data value input 2110 may increment or decrement the current data point value, depending on which input was selected. In further embodiments, the decrease point data value input 2108 and the increase point data value input 2110 may allow a user to continuously actuate the input, thereby decrementing or incrementing the point data value accordingly. The command dialog interface 2100 my further have a send input 2112 to save any changes made to the point data value by a user. The command dialog interface 2100 may further have a back input 2114 to disregard any changes made by the user.

Figure 22:
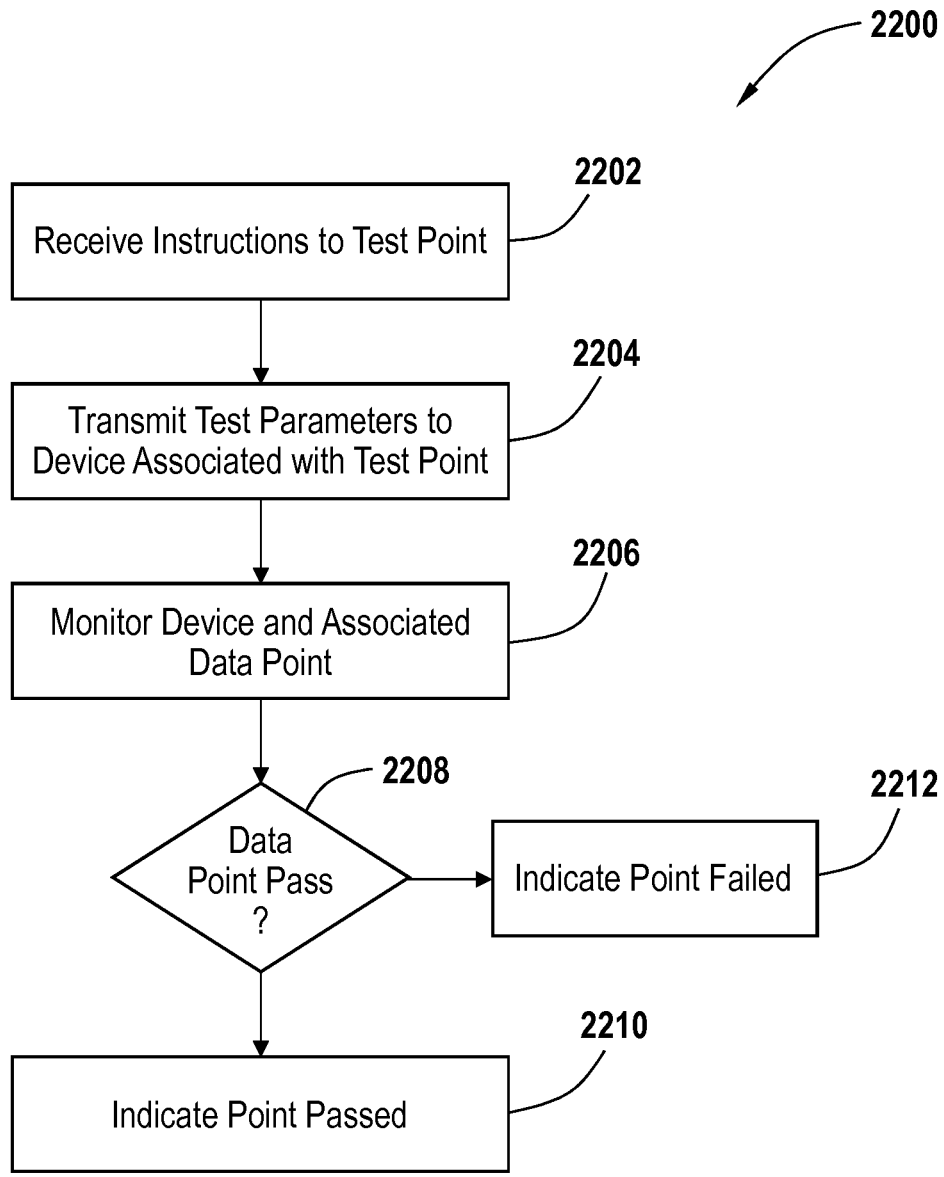
FIG. 22 is a flow chart illustrating a data point testing process, according to some embodiments.

Turning now to FIG. 22, a data point testing process 2200 is shown, according to some embodiments. At process block

2202, the BMS interface device 600 may receive an instruction to test one or more data points associated with one or more devices of the BMS. In one embodiment, the instruction may be provided to the BMS interface device 600 via the user interface 624. The BMS interface device 600 may then transmit the test parameters to the devices associated with the data points to be tested at process block 2204. Test parameters may vary for binary points and analog points. For example, a test parameter for a binary point may simply be an instruction to switch the output from a logic high, to a logic low, or vice versa. For analog points, the device may actuate the point over a range. For example, where the point is an actuator position, the BMS interface device 600 may instruct the actuator to open, twenty-five percent (25%), wait for a period of time and then have the actuator move to fifty percent (50%) open. Again, the BMS interface device 600 can wait for a period of time to verify the operation of the actuator. The BMS interface device 600 may continue to instruct the actuator to move to seventy-five percent (75%) open and one-hundred percent (100%) open, to verify the full range of operation.

At process block 2206, the BMS interface device 600 monitors the device and the associated data points being tested. For example, the BMS interface device 600 may monitor the point values to determine if they are behaving appropriately based on the transmitted test parameters. At process block 2208, the BMS interface device 600 can evaluate the data points being tested to determine if the data points have passed or failed. Where the points have not responded as expected based on the transmitted test parameters, the BMS interface device 600 may determine that the point has failed the test, and can indicate, via the user interface, that the points have failed at process block 2210. Alternatively, where the points have responded as expected based on the transmitted test parameters, the BMS interface device 600 may determine that the point has passed the test, and can indicate, via the user interface 624.

Figure 23:
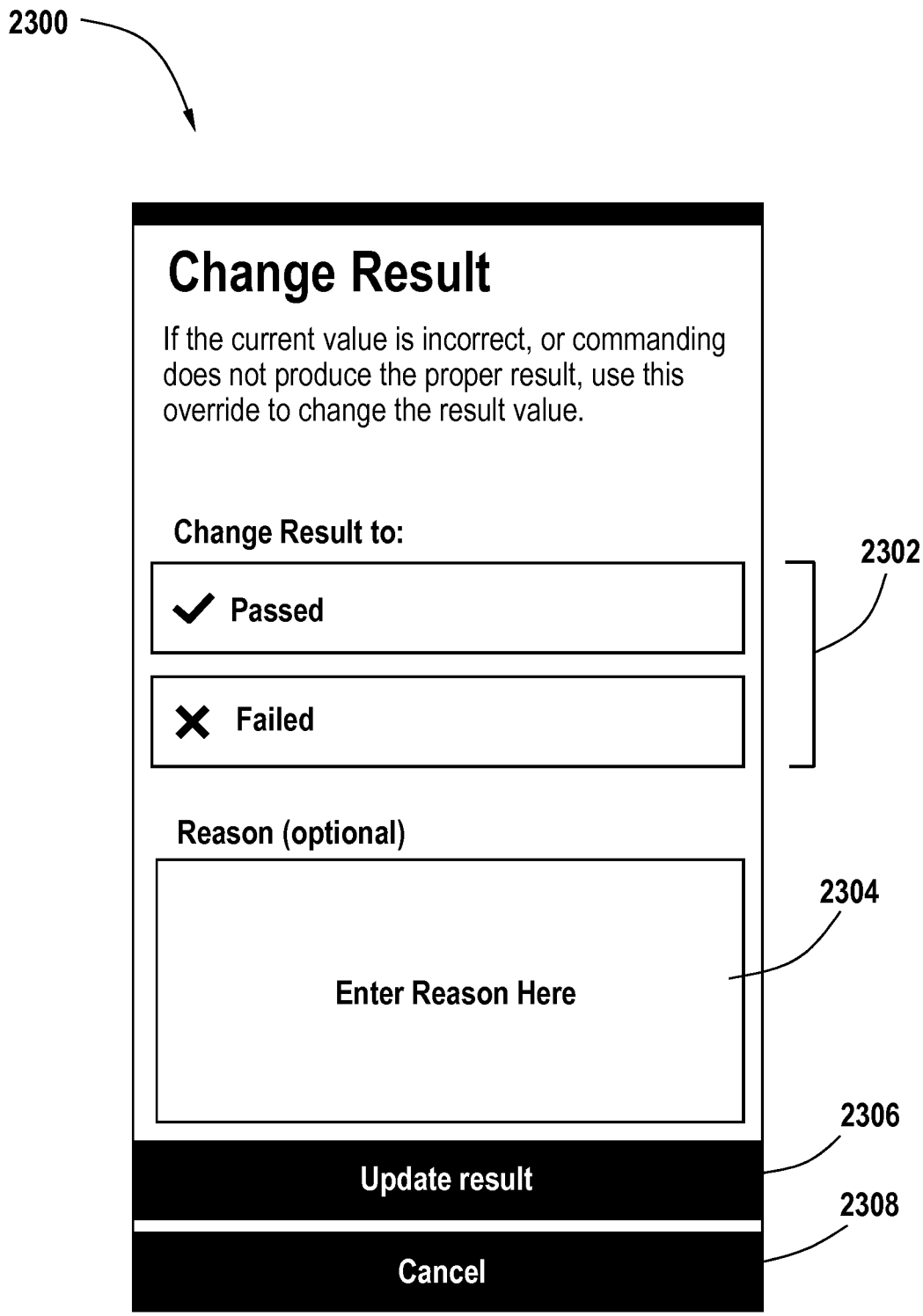
FIG. 23 is a screenshot illustrating a change results interface of the BMS interface device of FIG. 6, according to some embodiments.

In some implementations, a user may want to, or need to, modify the results of the test. For example, a user may need to modify a point status from "failed" to "passed," in order to complete a commissioning or troubleshooting of the system. Turning now to FIG. 23, a change result interface 2300 is shown, according to some embodiments. The change result interface 2300 may have a change result dialog section 2302 and an explanation section 2304. The change result dialog section 2302 may present a user with multiple options for changing the result. In one embodiment, the change result dialog section 2302 may present the user with the options to change the current result to "Passed" or "Failed." In some examples, only options that are different from the current status of the point are made available to the user for selection. For example, if the current state of the point is "Passed," the user may only be allowed to modify the result to indicate that the point is in a "Failed" condition, and vice versa. The explanation section 2304 may be a free text input area that allows a user to input a reason for manually modifying the test result of a point. In some examples, the explanation section 2304 may place a user name and/or time stamp on any reasoning provided to allow for future user to track previous modifications. The change result interface 2300 may further include an update result input 2306 to confirm the user modification, and a cancel input 2308 to instruct the BMS interface device 600 to disregard any changes input by the user.

Figure 24A:
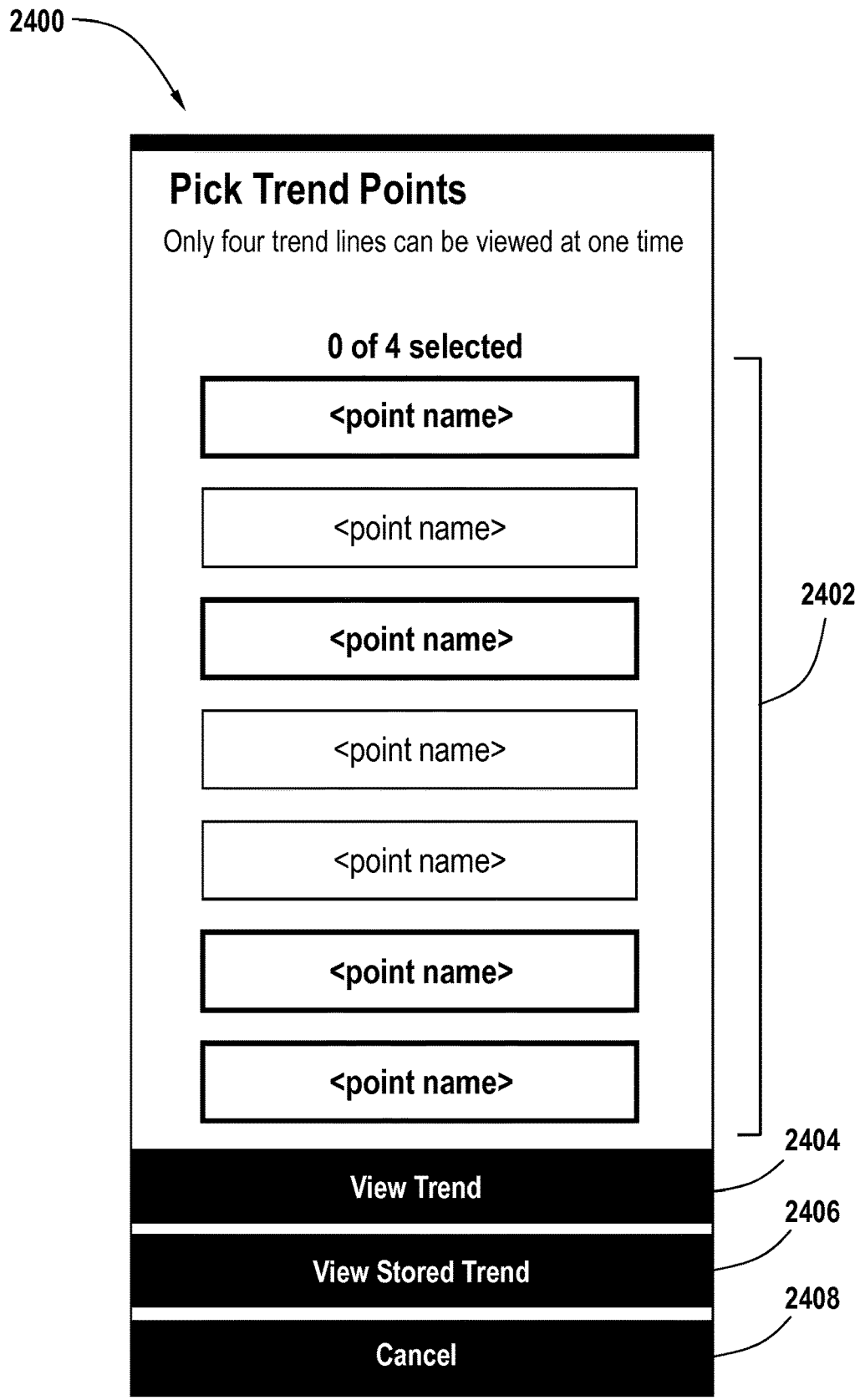
FIG. 24A is a screenshot illustrating a trend selection interface of the BMS interface device of FIG. 6, according to some embodiments.
Figure 24B:
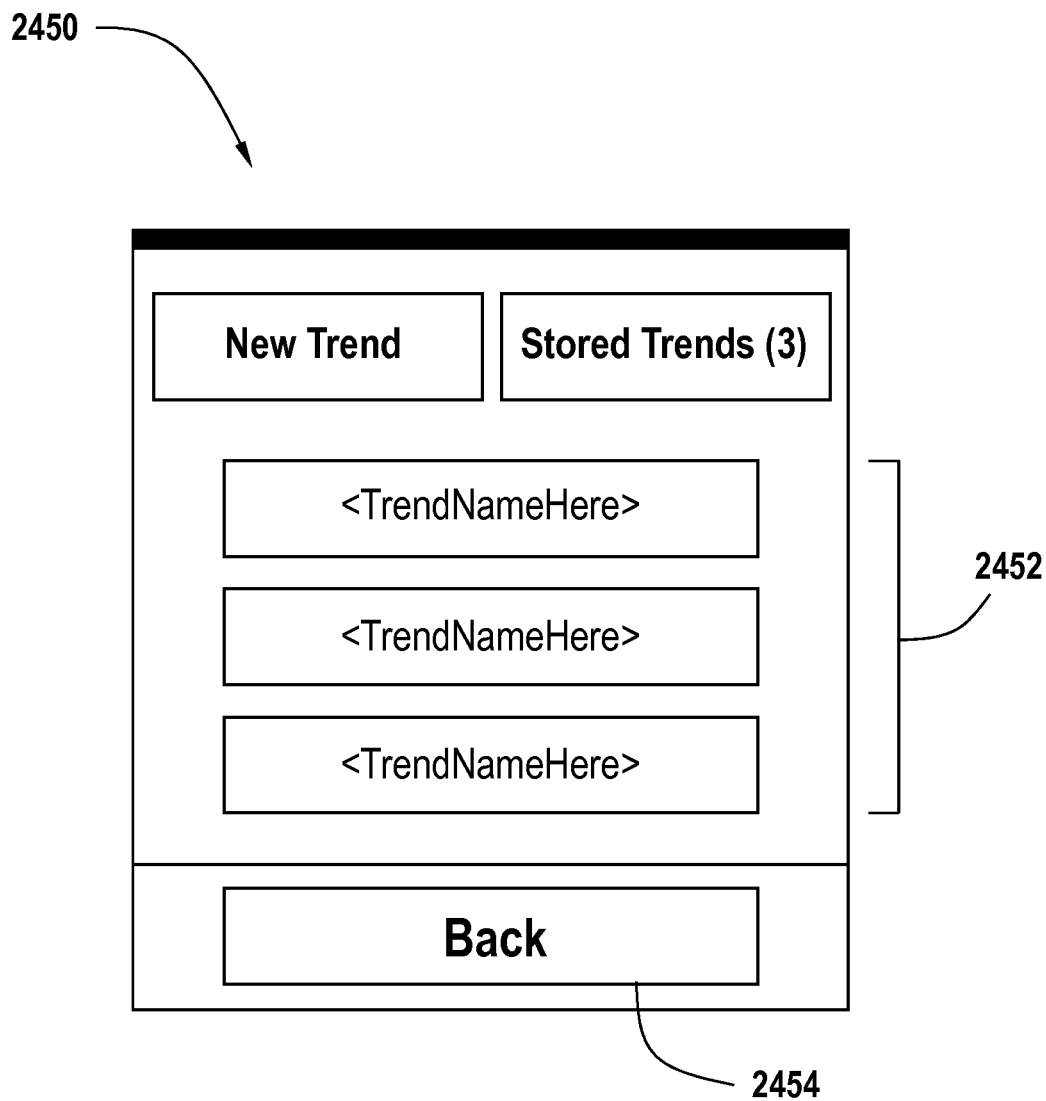
FIG. 24B is a screenshot illustrating a stored trend interface of the BMS interface device of FIG. 6, according to some embodiments.

Turning now to FIG. 24A, a trend selection interface 2400 is shown, according to some embodiments. The trend selection interface 2400 may include a point selection interface 2402, a view trend input 2404, a view stored trend input 2406 and a navigation input 2408. The point selection interface 2402 may provide the user with multiple points that can be used to generate a data trend. Once the user selects the desired points from the point selection interface 2402, the view trend input 2404 can be selected to instruct the BMS interface device 600 to generate a trend with the selected points. The view stored trend input 2406 can be used to select one or more previously saved trends for viewing by a user. Additionally, the user may select the navigation input 2408 to exit the trend selection interface 2400 without generating a trend. Turning now to FIG. 24B, a stored trend user interface 2450 is shown, according to some embodiments. The stored trend user interface 2450 may be generated by a user selecting the view stored trend input 2406, as shown in FIG. 24A. The stored trend user interface 2450 may include one or more stored trend inputs 2452. A user may select one or more of the stored trend inputs 2452 to display the selected trend. The stored trend user interface 2450 may further include a navigation input 2454 to exit the stored trend user interface 2450.

Figure 25:
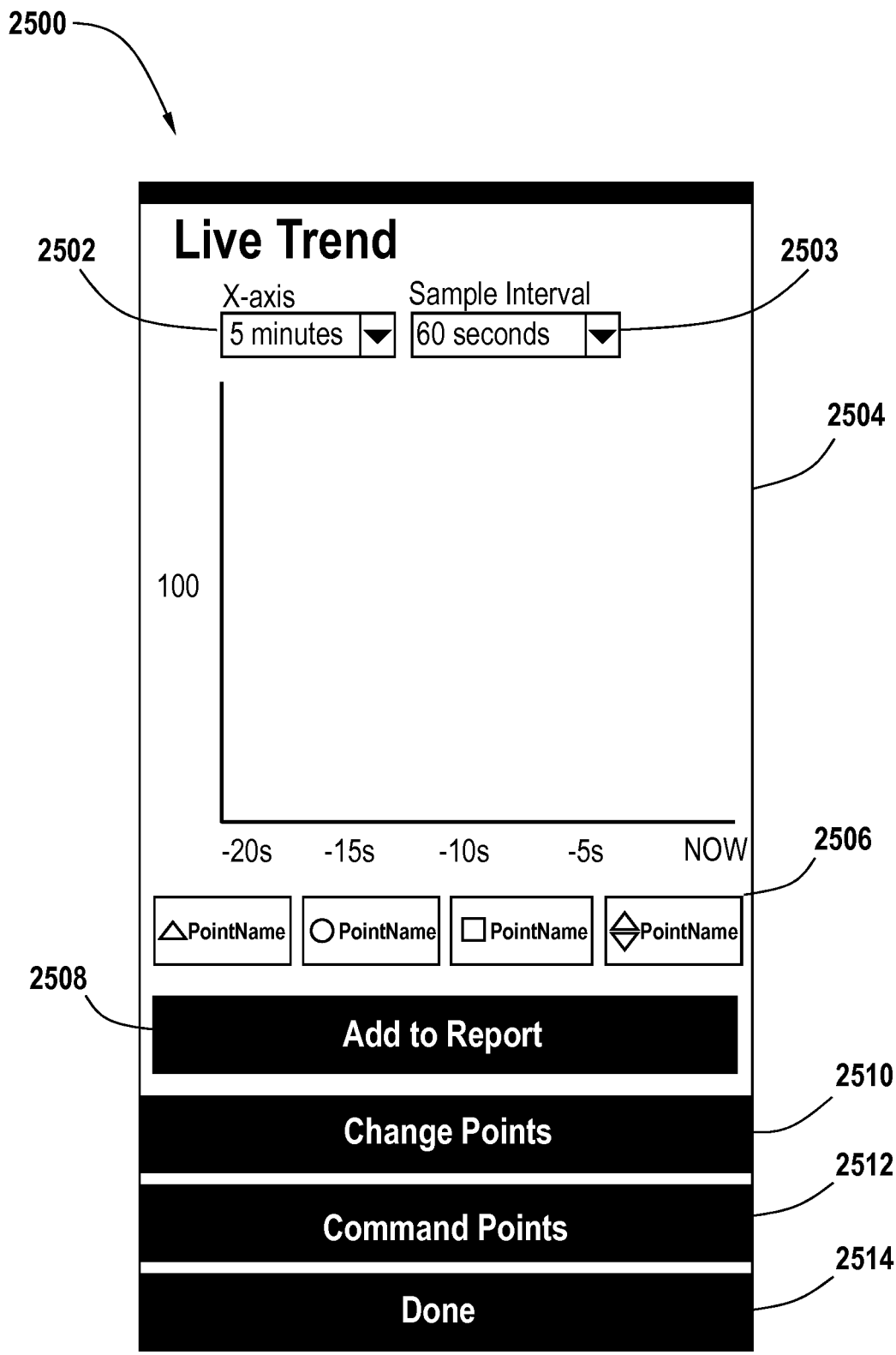
FIG. 25 is a screenshot illustrating a live trend interface of the BMS interface device of FIG. 6, according to some embodiments.

FIG. 25 is a screenshot illustrating a live trend interface 2500, according to some embodiments. The live trend interface 2500 can include an x-axis scale input 2502, a sample interval input 2503, a trend display section 2504, a point name modification interface 2506, and an add to report input 2508. The an x-axis scale input 2502 can allow a user to select the timeframe of the x-axis of the trend display section 2504. In one embodiment, the x-axis scale input 2502 may provide a drop down menu with defined timeframes from which a user can choose. The sample interval input 2503 may allow a user to select the sample rate associated with the trend. The trend display section 2504 may display graphical trend data associated with the values of one or more points selected using the trend selection interface 2400. In one embodiment, the trend display section 2504 can display the point data graphically as a two-axis graph, where the x-axis is a function of time, and the y-axis is a data value associated with each point. The point name modification interface 2506 can allow a user to select one of the trending points, and provide a custom name for each point. The add to report input 2508 can be selected to add the current trend data to a report generated by the BMS interface device 600. An change points input 2510 can allow a user to return to the trend selection interface 2400 to select different points to display in the live trend interface 2500. A command points input 2512 can be used to command one or more points associated with the trend to a user-defined value. Finally, the done input 2514 can be used to exit the live trend interface 2500.

In many BMS systems, balancing air flow throughout various systems and devices can be a complicated function to accomplish, particularly during initial commissioning of a system. Before airflow can be balanced, the controllers must first be properly calibrated with the associated air flow. Currently, there are multiple ways in which air flow can be calibrated in a system. In one embodiment, a single point calibration may be used to calibrate the airflow. In a single point calibration an equation can be used to determine a balanced k-factor value for use in balancing the air flow. In one embodiment, the k-factor is a gain value associated with the controller. For example, Equation 1, reproduced below, provide a method for calculating a balanced k-factor (referred to below a PickupGain$_{new}$).

$$PickupGain_{new} = \left(\frac{Flow_{controller}}{Flow_{Hood}}\right)^2 * PickupGain_{original} \qquad \text{Equation 1}$$

Figure 26:
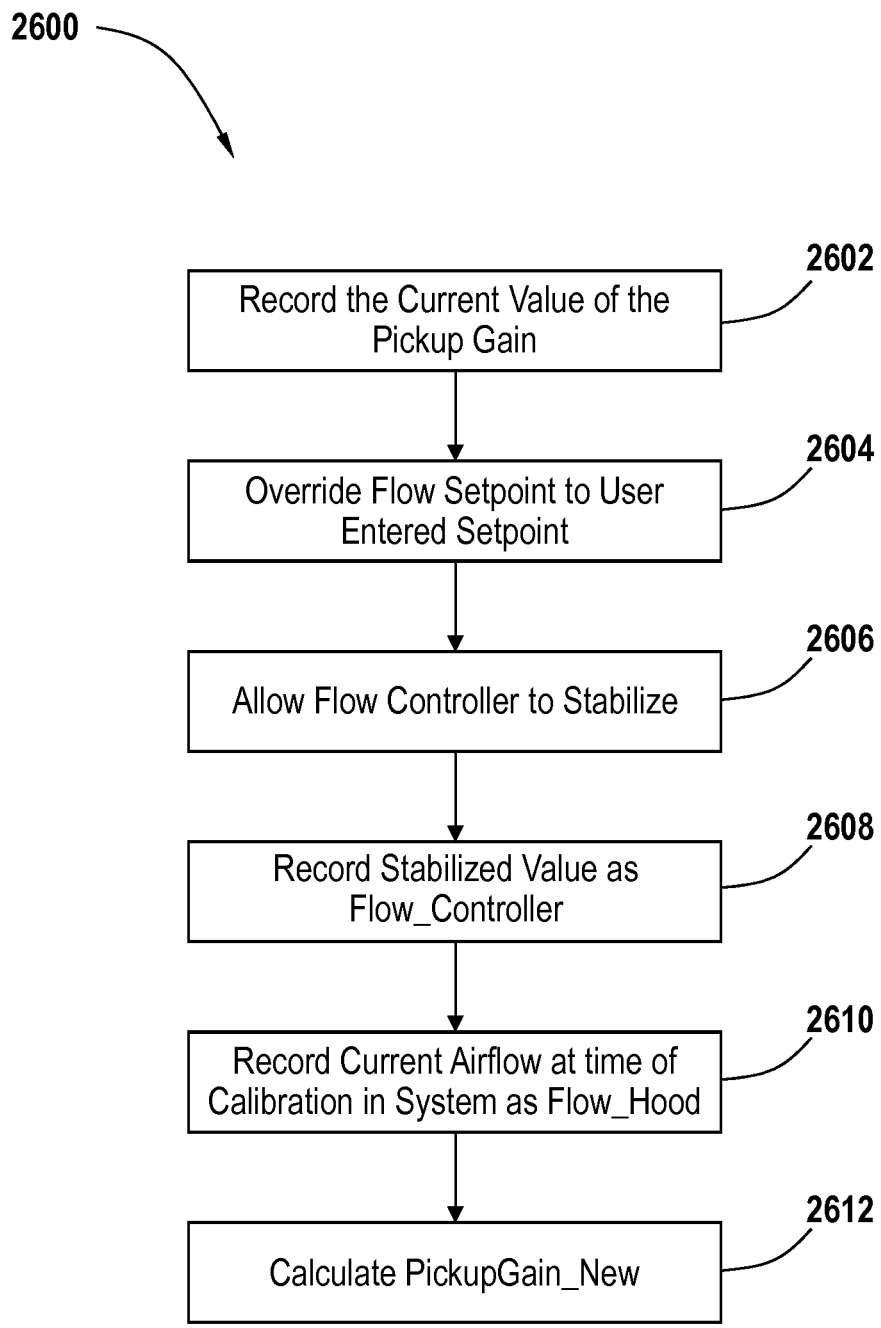
FIG. 26 is a flow chart illustrating a process for performing single point calibration, according to some embodiments.

Turning now to FIG. 26, a process 2600 for performing single point calibration is shown, according to some embodiments. At process block 2602 the BMS interface device 600 may record the current value of the k-factor (Pickup Gain). At process block 2604, the BMS interface device 600 can override a flow setpoint to a user entered flow setpoint. The user may enter the desired setpoint using the user interface 624, which will be described in more detail below. At process block 2606 the BMS interface device 600 can allow the flow controller to stabilize the air flow, and can record the stabilized airflow value at process block 2608, as $Flow_{controller}$. At process block 2610, the BMS interface device 600 can record the current airflow in the system as $Flow_{hood}$. The BMS interface device 600 can then calculate the balanced k-factor ($PickupGain_{new}$) using Equation 1, shown above.

Figure 27:
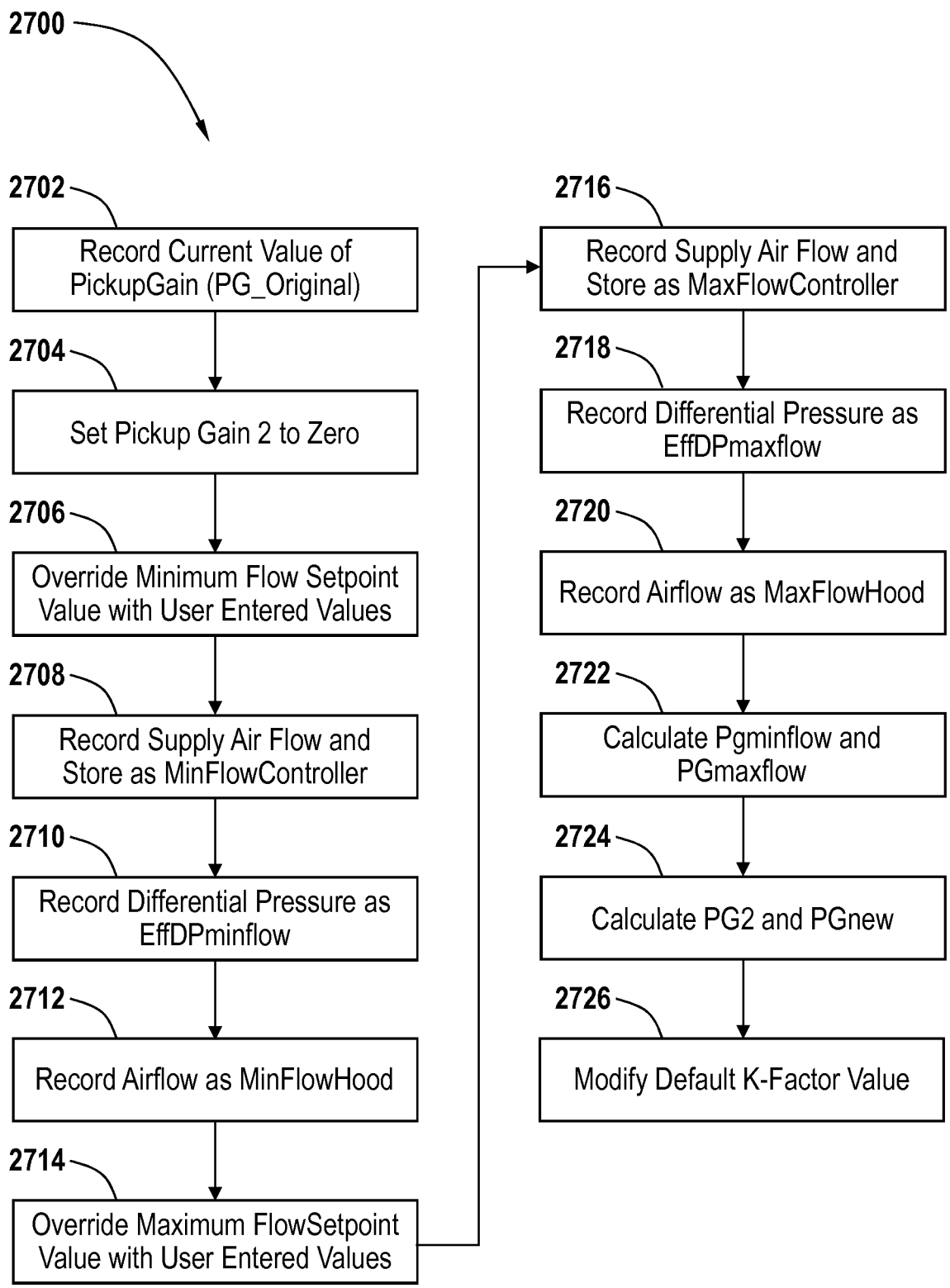
FIG. 27 is a flow chart illustrating a process for performing two point calibrations, according to some embodiments.

In some instances, a two-point calibration is used to calibrate airflow in a BMS system. FIG. 27 is a flow chart illustrating a process 2700 for calibrating an airflow in a BMS system using two-point calibration. At process block 2702, the BMS interface device 600 can record the current value of the Pickup Gain as $PickupGain_{original}$. At process block 2704, the Pickup Gain value is set to zero, if not done already. At process block 2706, the existing minimum flow setpoint is overridden by a minimum flow set point entered by a user. In one embodiment, the user may enter the flow set point using the user interface 624. At process block 2708, the BMS interface device will record the supply air flow value and store as MinFlowController. At process block 2712, the BMS interface device 2710 will record the differential pressure as EffDPminflow. At process block 2712 the BMS interface device 600 will record measured airflow as MinFlowHood. At process block 2714, the existing maximum flow setpoint is overridden by a maximum flow set point entered by a user. In one embodiment, the user may enter the maximum flow set point using the user interface 624. At process block 2716, the BMS interface device 600 will record the supply air flow and store the value as MaxFlowController. At process block 2718, the BMS interface device 600 can record the differential pressure and store the value as EffDPmaxflow. At process block 2720, the BMS device the PGminflow and PGmaxflow values. In one embodiment, PGminflow is calculated using Equation 2, and PGmaxflow is calculated using Equation 3. Both are reproduced below.

$$PGminflow = \left(\frac{MinFlowController}{MinFlowHood}\right)^2 * PGoriginal \qquad \text{Equation 2}$$

$$PGmaxflow = \left(\frac{MaxFlowController}{MaxFlowHood}\right)^2 * PGorignal \qquad \text{Equation 3}$$

At process block 2724, the BMS interface device 600 may calculate values for PG2 and PGnew. In one embodiment, PG2 may be calculated using Equation 4, and PGnew may be calculated using Equation 5, both represented below.

$$PG2 = \frac{PGmaxflow - PGminflow}{EffDPmaxflow - EffDPminflow} \qquad \text{Equation 4}$$

$$PGnew = PGminflow - (EffDPminflow * PG2) \qquad \text{Equation 5}$$

At process block 2726, the BMS interface device 600 updates the default k-factor with the PGnew value calculated in process block 2724. In one embodiment, the BMS interface device 600 may receive flow values from one or more devices associated with the BMS. In other embodiments, the BMS interface device may receive flow values manually entered by a user.

Figure 28:
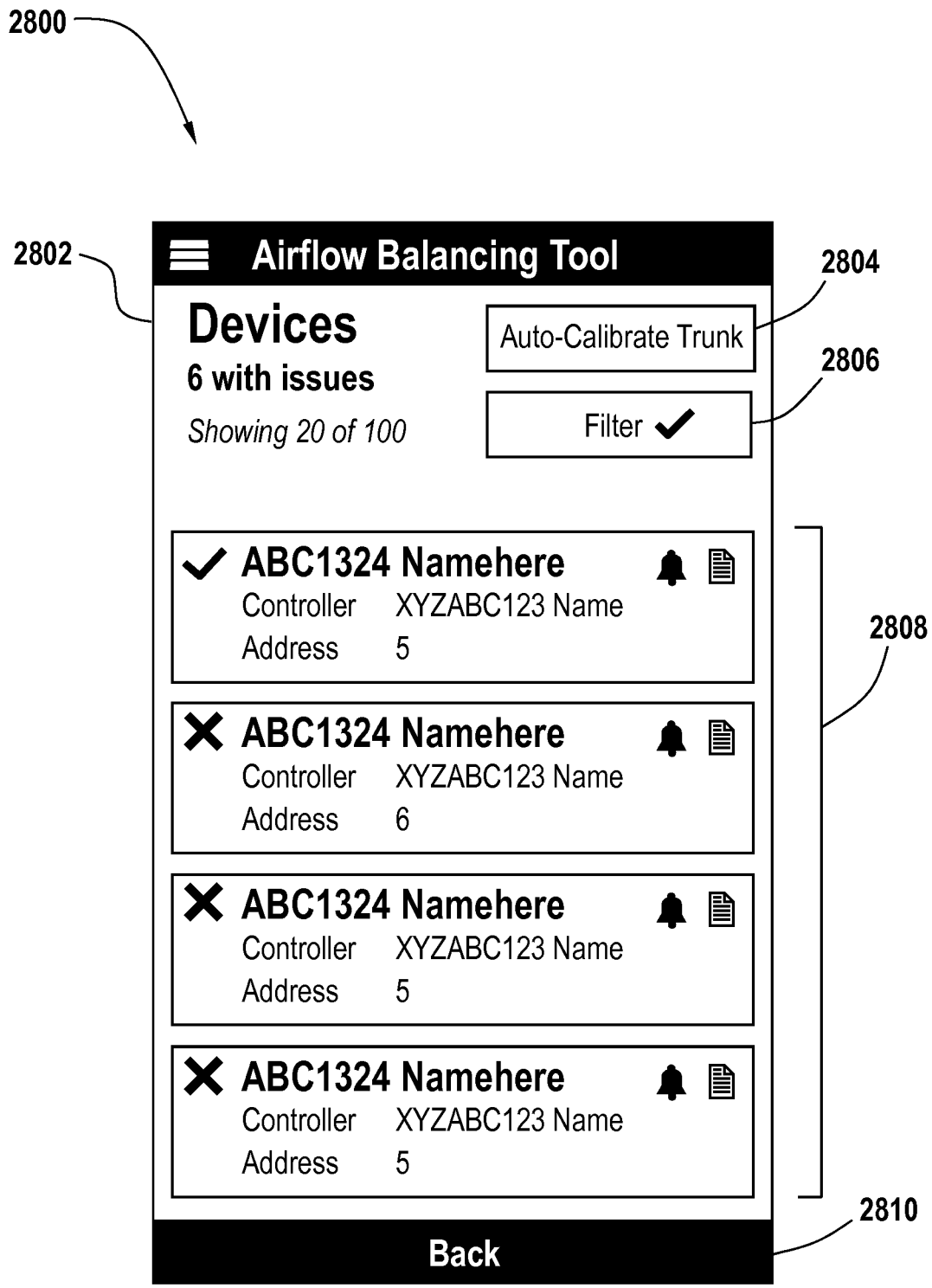
FIG. 28 is a screenshot illustrating an airflow balancing tool interface of the BMS interface device of FIG. 6, according to some embodiments.

Turning now to FIG. 28, a screenshot illustrating an airflow balancing tool interface 2800 is shown, according to some embodiments. The airflow balancing tool interface 2800 may have a device summary section 2802, an auto-calibrate trunk input 2804, a filter input 2806, a device list 2808 and a navigation button 2810. The device summary section 2802 may indicate the number of listed devices, as well as a number of the devices which may be experiencing an alarm, or other issue such as a measured imbalance. The auto-calibrate trunk input 2804 may allow a user to instruct the BMS interface device 600 to calibrate all controllers on a given trunk (e.g. network). In some embodiments, the user may be presented with an option to stagger the testing of the controllers to prevent over pressurization of the ducting within the BMS. The auto-calibration function can support standard HVAC systems, such as single duct, single duct with exhaust, dual duct, dual duct with exhaust, and air handling systems. In one embodiment, the auto-calibrate trunk input 2804 can instruct the BMS interface device to balance the air flow in the system using the above single point calibration process 2600 or the above two point calibration process 2700. The filter input 2806 may initiate a filter devices interface to allow the user to filter the devices associated with a given trunk. The device list 2808 can provide a list of devices associated with the trunk. In one embodiment, the device list 2808 can provide an indication for each listed device indicating whether the device is balanced. For example, a "checkmark" may indicate that the device is balanced, and an "x" may indicate that the device is not balanced. However, other indications are contemplated.

Figure 29:
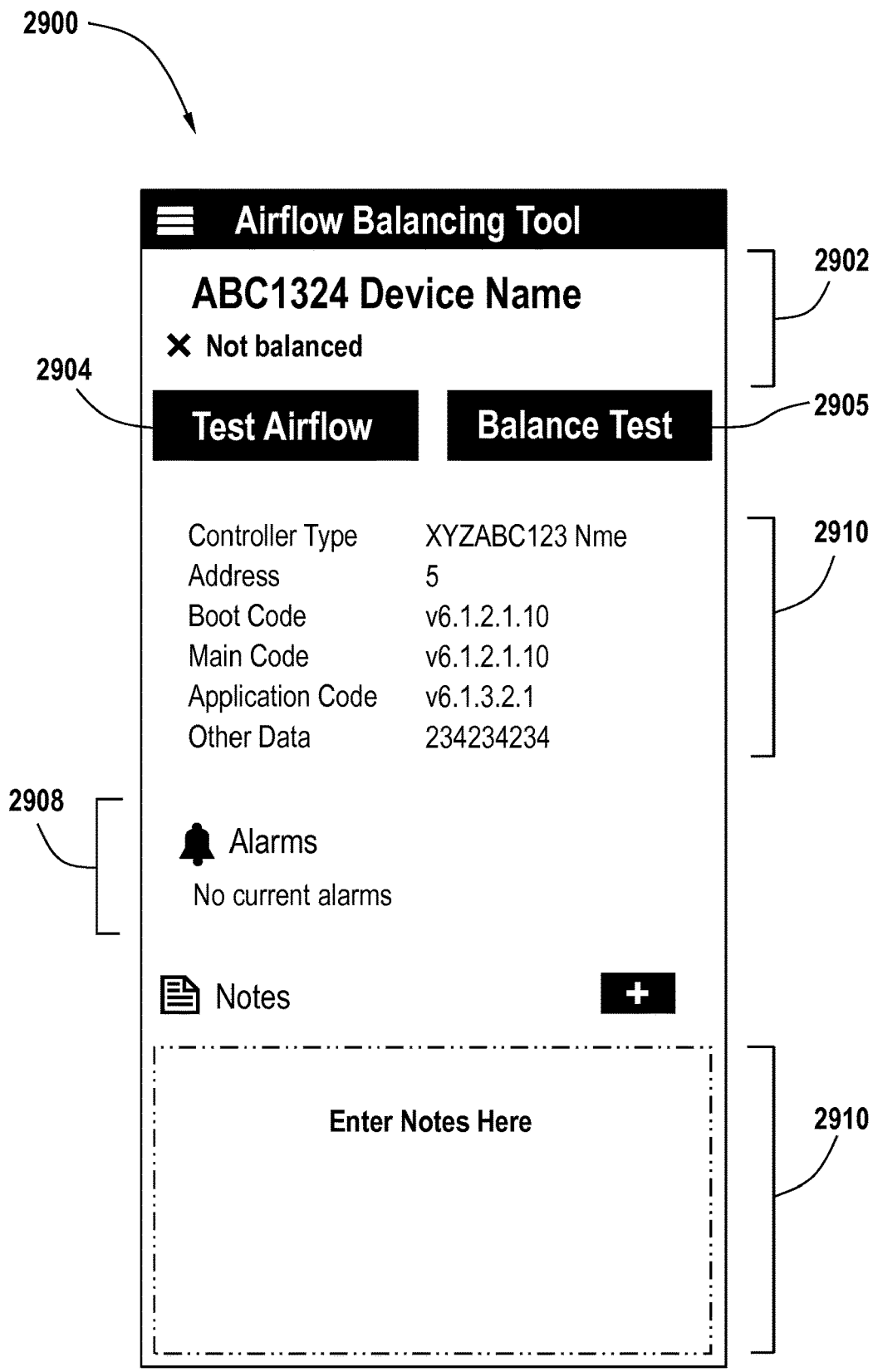
FIG. 29 is a screenshot illustrating a detailed device balancing interface of the BMS interface device of FIG. 6, according to some embodiments.

The device list 2808 can further allow a user to select a single device. Once a single device is selected a detailed device balancing interface 2900 may be generated, as shown in FIG. 29. The detailed device balancing interface 2900 may have a device summary section 2902, a test airflow input 2904, a reset results input 2905, a device detail section 2906, an alarms section 2908 and a notes section 2910. The device summary section 2902 may provide basic information about the selected device, such as a device name and a status (e.g. is the device balanced?). The test airflow input 2904 can be selected to initiate a balancing test process on the selected device. The reset results input 2905 can be used to reset previously generated data based on a previous airflow balance operation. The device details section 2906 can display detailed information about the device. For example, the device details section 2906 may provide data relating to the selected devices such as controller type, address of the device, boot code version of the device, main code version of the device, application code version of the device, as well as other data. The alarms section 2908 may be configured to list all alarms associated with the selected device. Finally, the notes section 2910 can include one or more notes associated with the device. Further, the notes section 2910 may allow a user to input further notes, if desired.

Figure 30:
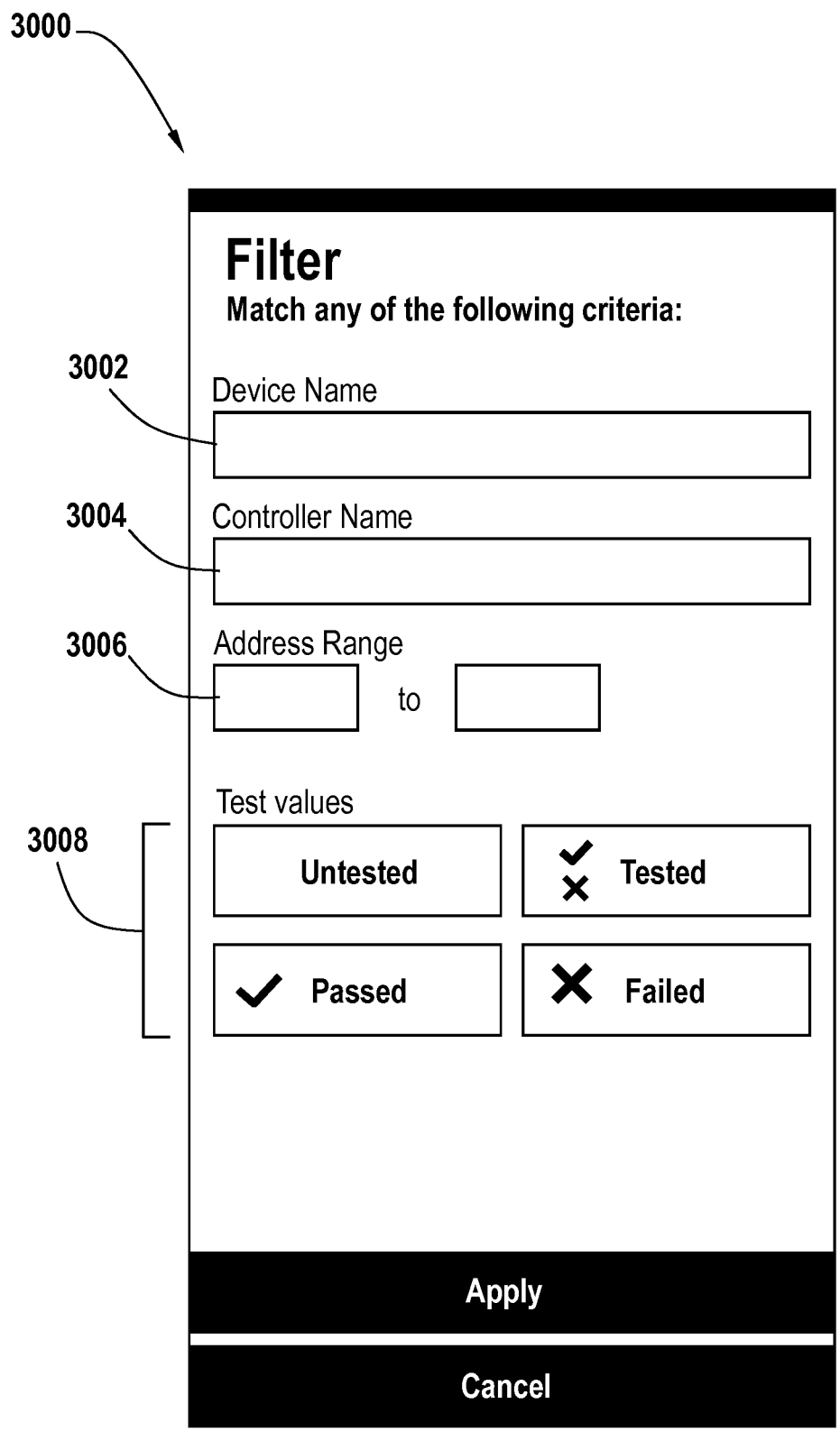
FIG. 30 is a screenshot illustrating a device balancing list filter interface of the BMS interface device of FIG. 6, according to some embodiments.

Turning now to FIG. 30, a screenshot illustrating a device balancing list filter interface 3000 is shown, according to some embodiments. The device balancing list filter interface 3000 may be generated when a selects the filter input 2806 of the airflow balancing tool interface 2800. The device balancing list filter interface 3000 may allow a user to filter the devices listed in the airflow balancing tool interface 2800 using a device name dialog 3002. The device name dialog 3002 may be free form text interface allowing a user to input a desired device name using the user interface 624. In further embodiments, a user can filter the devices listed in the airflow balancing tool interface 2800 using a controller name dialog 3004 to filter by the name of the controller associated with one or more devices. The controller name dialog 3004 may be a free form text interface allowing a user to input a desired controller name using the user interface 624. In further embodiments, the user can filter the devices listed in the airflow balancing tool interface 2800 using an address range dialog 3006. In one embodiment, the address range dialog 3006 may have two separate free form text dialog boxes allowing a user to input a first address value and a second address value. The BMS interface device 600 may then filter the devices by only listing devices having an address range between the first address value and the second address value. Finally, a test value dialog 3008 may allow a user to filter the devices listed in the airflow balancing tool interface 2800 by a test value of the device. In some embodiments, a list of possible test values are presented to a user in the test value dialog 3008. For example, possible test values include untested devices, tested devices, passed devices and failed devices. A user may then select one or more of the possible test values using the user interface 624, and the BMS interface device 600 will then filter the listed devices based on the user input. In some embodiments, a user can filter the devices listed in the airflow balancing tool interface 2800 using one or more of the above filtering options. The device balancing list filter interface 3000 may further include an apply input 3010 to apply the filters selected by the user, and a cancel input 3012 to disregard any filters selected by the user.

Figure 31A:
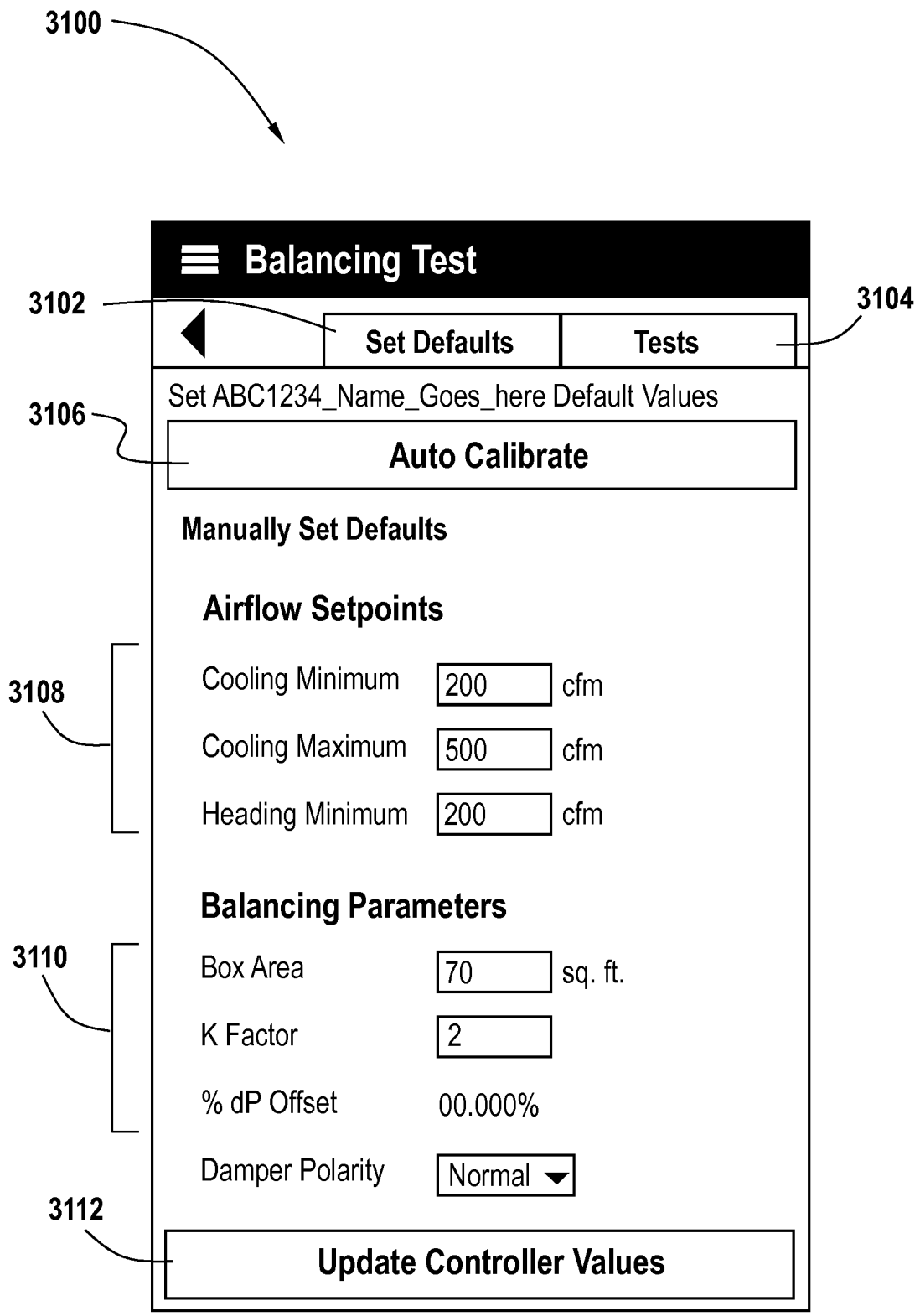
FIG. 31A is a screenshot illustrating a balance test interface of the BMS interface device of FIG. 6, according to some embodiments.

Turning now to FIG. 31A, a screenshot illustrating a balance test interface 3100 is shown, according to some embodiments. The balance test interface 3100 may be generated when the user selects the test airflow input 2904 of the detailed device balancing interface 2900 described above. The balance test interface 3100 may include a set defaults tab 3102, and a tests tab 3104. The balance test interface 3100 of FIG. 31 illustrates a balancing test interface associated with the set defaults tab 3102. The balance test interface 3100 may have an auto-calibration input 3106 that allows the user to auto-calibrate the selected device. In one embodiment, the auto-calibration input 3106 can instruct the BMS interface device 600 to calibrate the device using the above single point calibration process 2600 or the above two point calibration process 2700. The balance test interface 3100 may further include a default values input section 3108. The default values input section 3108 may display the parameter values needed to balance the associated device. Example, required default values can include the minimum cooling setting, the maximum cooling setpoint, the heating setting minimum, and the k-factor. In some embodiments, more parameters, or fewer parameters may be displayed, depending on the controller being balanced. The balance test interface 3100 may further include a balancing parameters input section 3110. The balancing parameters input section 3110 can allow for a user to input one or more balancing parameters, such as box area, k factor, and/or damper polarity. An update controller values input 3112 can be used to instruct the BMS interface device 600 to send the default parameter values entered in the default values input section 3108 and the balancing parameters input section 3110, to the selected device.

Figure 31B:
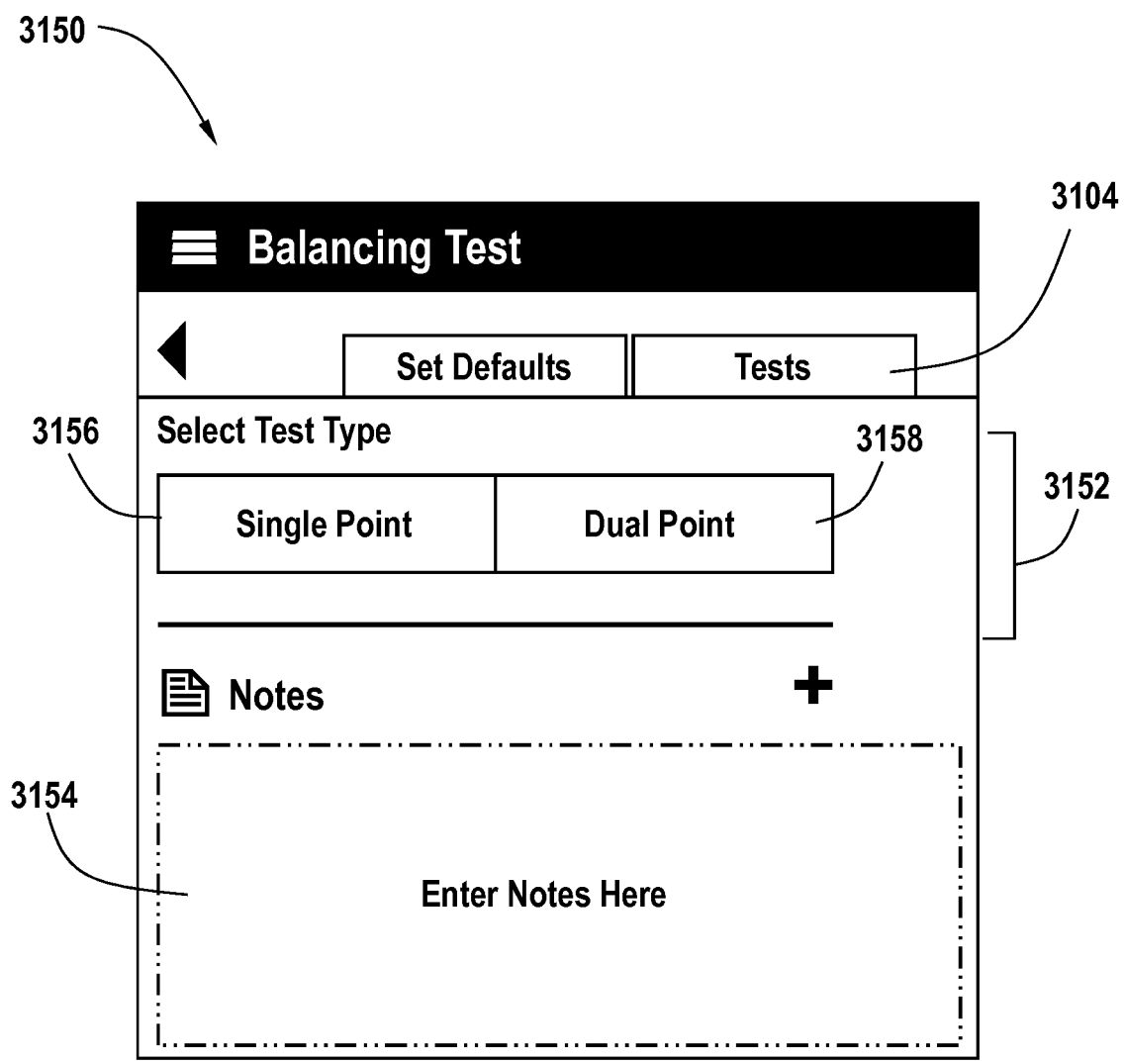
FIG. 31B is a screenshot illustrating a balance test selection interface of the BMS interface device of FIG. 6, according to some embodiments.

Turning now to FIG. 31B, a screenshot illustrating a balance test selection interface 3150 is shown, according to some embodiments. The balance test selection interface 3150 may be generated when the user selects the tests tab 3104 of the balance test interface 3100. The balance test selection interface 3150 may have a test type selection interface 3152 and a notes section 3154. The test type selection interface 3152 may include one or more test type inputs that the user can select. As shown in FIG. 31B, possible tests include single point tests, and dual point tests. In some embodiments, there may be more test type inputs or fewer test type inputs, as necessary. The test type selection interface 3152 illustrates a single point test input 3156 and a dual point test input 3158. However, other test type inputs may be available in other systems. For example, the test type selection interface 3152 may include other test types, such as max flow tests, half flow tests, custom tests, etc.

Figure 32:
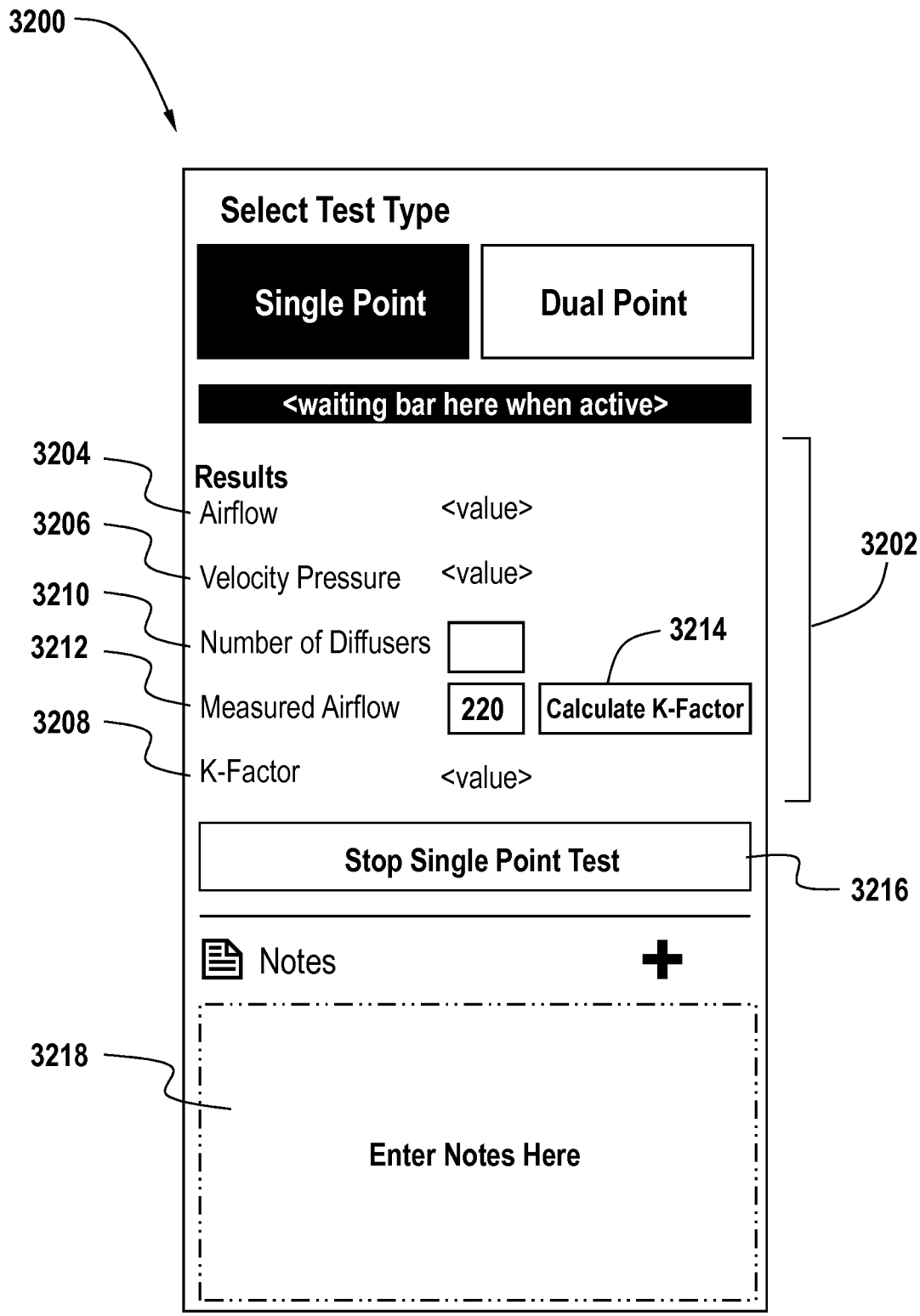
FIG. 32 is a screenshot illustrating a single point test interface of the BMS interface device of FIG. 6, according to some embodiments.

Turning now to FIG. 32 an example single point test interface 3200 is shown, according to some embodiments. The single point test interface 3200 may be generate when a user selects the single point test input 3156 described above. The single point test interface 3200 may include a results portion 3202. The results portion 3202 may include inputs and outputs associated with the test. For example, the results portion 3202 may include an airflow output 3204, a velocity pressure output 3206, a k-factor output 3208, a number of diffusers input 3210, and a measured airflow input 3212. The single point test interface 3200 may further include a calculate k-factor input 3214. The calculate k-factor input 3214 can be used to instruct the BMS interface device 600 to calculate the new k-factor based on the measured airflow value, the number of diffusers, and one or more of the parameters entered via the balance test interface 3100. The new k-factor can then be sent to the device associated with the test. The single point test interface 3200 may also include a stop test input 3216 which can be used to stop the test at any time, by a user. A notes portion 3218 may further be included on the single point test interface 3200 for viewing or inputting notes associated with the test.

Figure 33:
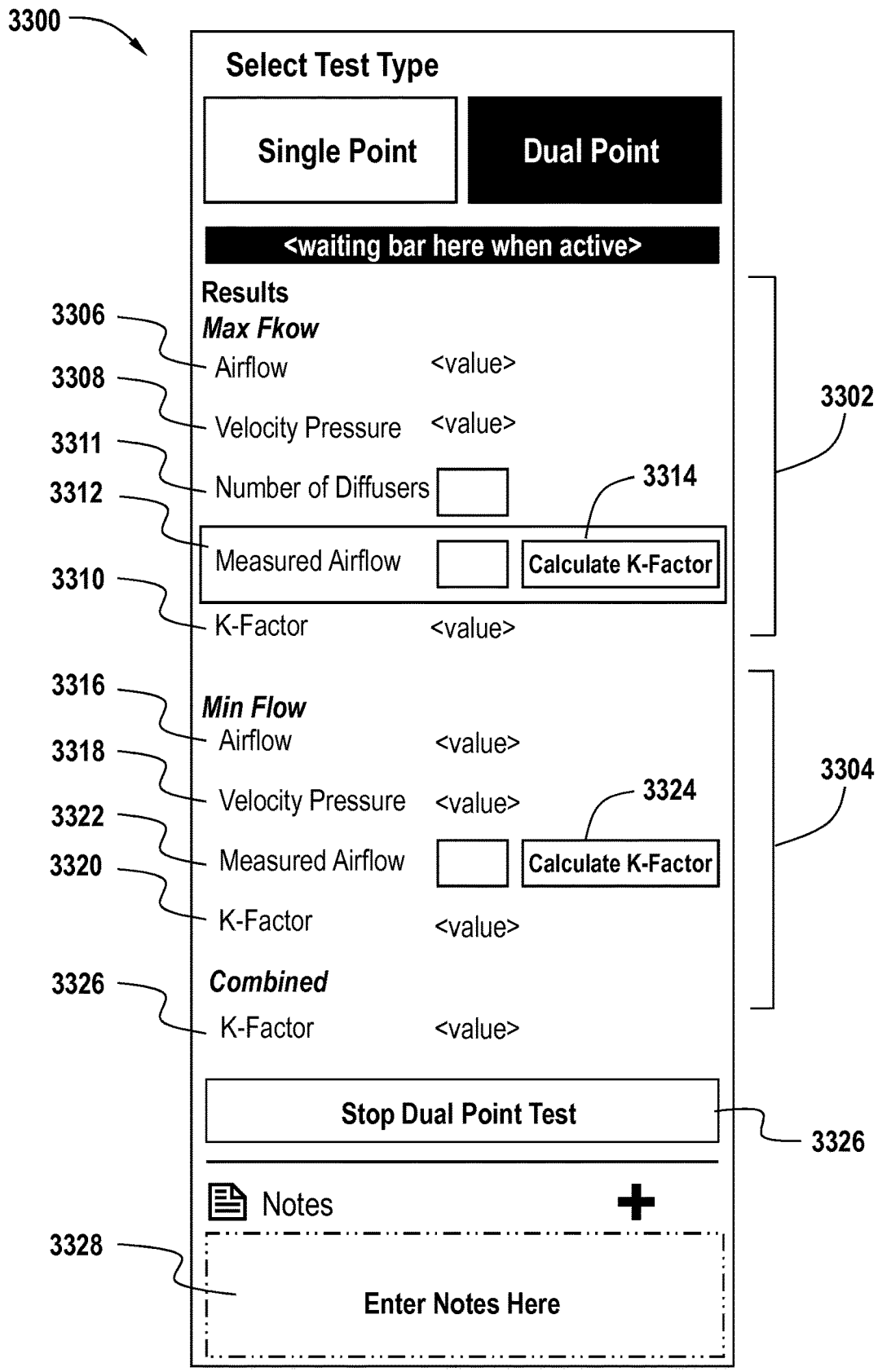
FIG. 33 is a screenshot illustrating a dual-point test interface of the BMS interface device of FIG. 6, according to some embodiments.

Turning now to FIG. 33, a screenshot illustrating a dual-point test interface 3300 is shown, according to some embodiments. The dual-point test interface 3300 may require the user input a measured airflow during a maximum airflow portion of the test, and a measured airflow during the minimum airflow portion of the test. The dual-point test interface 3300 may include a max flow results portion 3302 and a minimum flow results portion 3304. The max flow results portion 3302 may include a number of inputs and outputs. For example, the max flow results portion 3302 may include an airflow output 3306, a velocity pressure output 3308, a k factor output 3310, a number of diffusers input 3311, and a measured airflow input 3312. The max flow results portion 3302 may also include a calculate k-factor input 3314. After inputting the maximum measured airflow and the number of diffusers, the user can instruct the BMS interface device 600 to calculate a first k-factor, by selecting the maximum airflow calculate k-factor input 3314.

The minimum flow results portion 3304 may include an airflow output 3316, a velocity pressure output 3318, a k-factor output 3320, and a minimum measured airflow input 3322. The user can then input the measured airflow monitored during the minimum flow portion of the test into the minimum measured airflow input 3322. After inputting the minimum measured airflow, the user can instruct the BMS interface device 600 to calculate a second k-factor, by selecting a minimum airflow calculate k-factor input 3324. Once both k-factors have been calculated, the BMS interface device 600 can send the combined k-factor to the device associated with the test. A notes portion 3328 may further be included on the dual-point test interface 3300 for viewing or inputting notes associated with the test.

Figure 34:
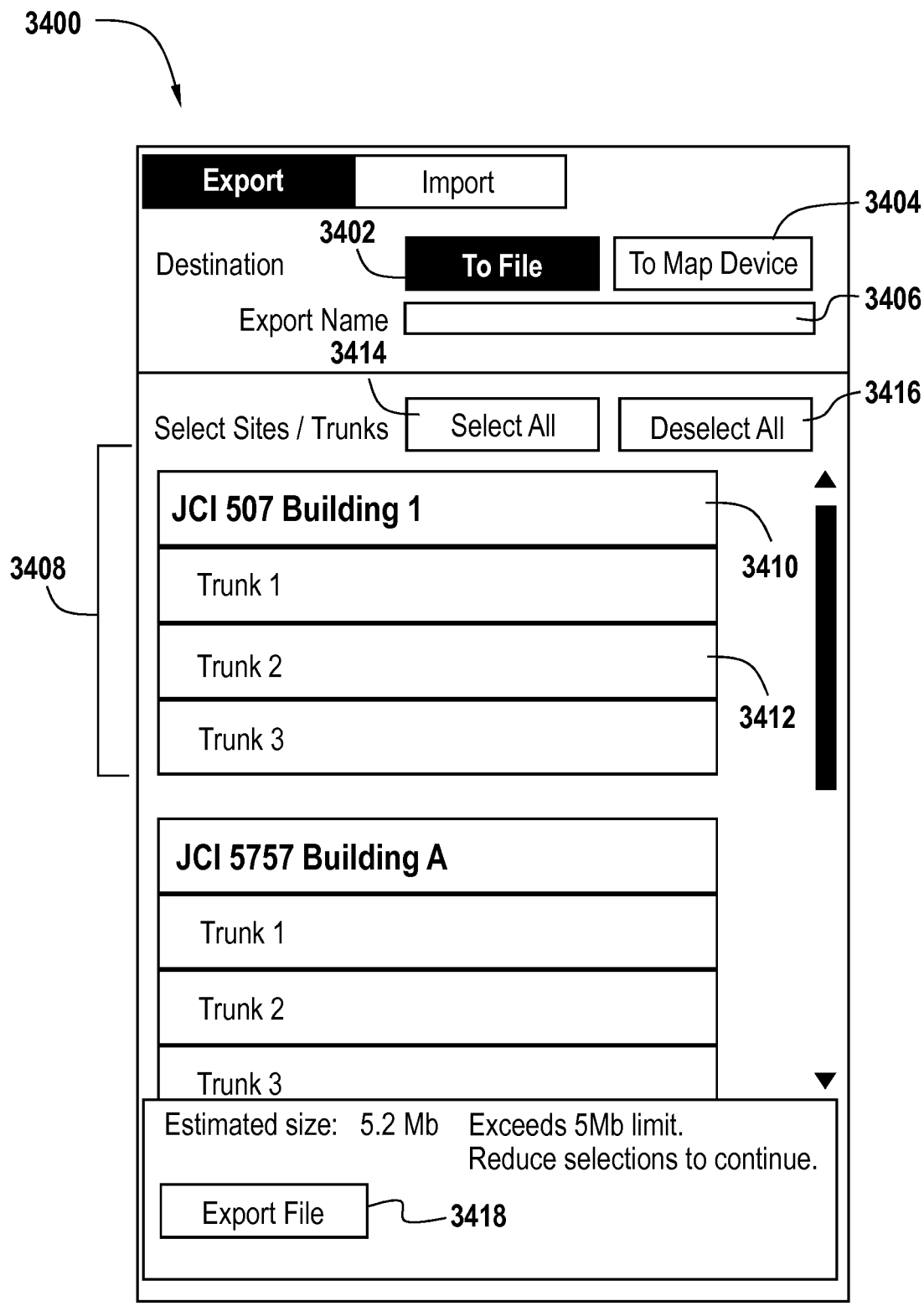
FIG. 34 is a screenshot illustrating a project export interface of the BMS interface device of FIG. 6, according to some embodiments.

Turning now to FIG. 34, a screenshot illustrating a project export interface 3400 is shown. The project export interface 3400 can be used to export a project file generated by the BMS interface device 600. The project export interface 3400 may include one or more destination inputs. For example, the destination inputs can include a to-file destination input 3402, and a to-MAP device 3404. The destination inputs can be selected by a user to select a destination for exporting the project file. Exporting the file can be used to allow for the project file to be exported to allow others to access the project file. An export name input 3406 may be used to allow a user to provide a name of the exported project file. The project export interface 3400 may further include one or more summary portions 3408. The summary portions 3408 can include a site input 3410, and one or more trunk inputs 3412 associated with the site. A user may select either the site input 3410 or one or more of the trunk inputs 3412 to select which portions of the project to export. In one embodiment, selecting a site input 3410 may select all trunks associated with the site. The project export interface 3400 may also include a select all input 3414 and a deselect all input 3416. The select all input 3414 may be used to select all the sites listed in the project export interface 3400. Similarly, the deselect all input 3416 can allow a user to deselect all previously selected sites and/or trunks. Finally, the project export interface 3400 may include an export file input 3418 to complete the export of the project file.

Figure 35:
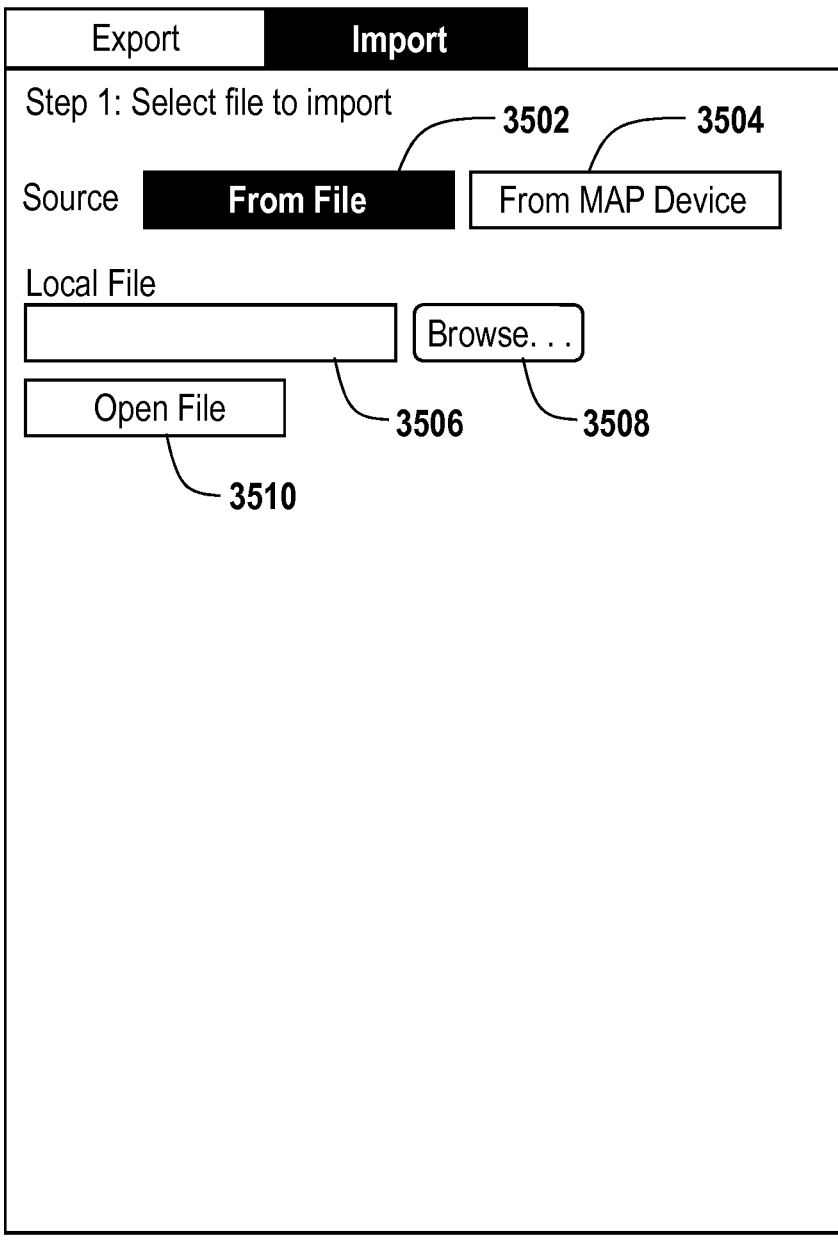
FIG. 35 is a screenshot illustrating a project import interface of the BMS interface device of FIG. 6, according to some embodiments.

FIG. 35 is a screenshot illustrating a project import interface 3500. The project import interface 3500 can be used to import a previously exported project file. The project import interface 3500 may include a number of source inputs, including a from-file source input 3502 and a from-MAP device input 3504. The from-file source input 3502 can be selected to allow the user to import a project file from a stored file. The from-MAP device input 3504 can be selected to allow the user to import a project file directly from a connected MAP device. If the user selects the from-file source input 3502, the user may input the file location in the local file input 3506, or select the browse input 3508 to select from one or more files stored on a device associated with the project import interface 3500. Finally, an open file input 3510 may be selected to open the selected project file, completing the import.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) network interface device comprising:
 an external communication device configured to provide communication between the BMS network interface device and one or more user devices over an external network;
 a BMS network communication interface for communicating with one or more BMS devices over a second network; and
 a processing circuit, comprising a plurality of tools, the tools configured to be accessed via a user interface, and further configured to communicate with one or more BMS devices on the second network, the plurality of tools comprising a tailored view tool and a device checkout tool;
 wherein the device checkout tool is configured to:
  allow a user to select one or more BMS devices on the second network and display one or more points of the selected BMS devices using the user interface;
  allow the user to select one or more tests to execute on the selected BMS devices, wherein the tests are configured to send a command to the BMS network communication interface to modify the one or more points of the selected BMS devices via the second network, wherein modifying the one or more points comprises adjusting an operation performed by the selected BMS devices, the adjusted operation producing an output; and monitor, via the second network, the output of the selected BMS devices to determine the results of the tests.

2. The device of claim 1, wherein the plurality of tools further comprises an air balancing tool, the air balancing tool configured to balance an airflow associated with the one or more BMS devices on the second network.

3. The device of claim 2, wherein the air balancing tool is further configured to automatically calibrate the one or more BMS devices on the second network.

4. The device of claim 3, wherein automatically calibrating the one or more BMS devices on the second network comprises generating a gain value for each of the devices.

5. The device of claim 1, wherein the device checkout tool is configured to generate a list of all the one or more points associated with each selected BMS device for display via the user interface.

6. The device of claim 5, wherein the device checkout tool is configured to test all the one or more points associated with each selected BMS device.

7. The device of claim 5, wherein the device checkout tool is configured to allow the user to modify a value of the one or more points associated with each selected BMS device.

8. The device of claim 5, wherein the device checkout tool is configured to display a trend associated with the one or more data points associated with each selected device.

9. The device of claim 1, wherein the BMS network interface device further comprises a web server, the web server configured to generate the user interface, wherein the user interface is configured to display on the one or more user devices.

10. The device of claim 9, wherein the one or more user devices is a smartphone.

11. The system of claim 10, wherein the device checkout tool is further configured to allow the user to select a field device of the one or more field devices associated with the building management system.

12. The system of claim 11, wherein the device checkout tool is configured to display the one or more data points associated with the selected field device.

13. The system of claim 11, wherein the device checkout tool is configured to display a trend associated with the one or more data points associated with the field device.

14. A building management system, the system comprising:
   a field controller device;
   one or more field devices, the one or more field devices in communication with the field controller device;
   a configuration device in communication with the field controller device, and comprising:
   a processing circuit, comprising a plurality of tools, the tools configured to allow a user, via a user interface, to configure one or more BMS devices on a BMS network, the plurality of tools comprising an air balancing tool and a device checkout tool; and
   a user device, the user device in communication with the configuration device;
   wherein the device checkout tool is configured to allow the user to;
      select one or more field devices and view one or more parameters associated with the selected field devices using the user device;
      select one or more tests to execute on the selected field devices, wherein the tests are configured to send a command to the field controller device to modify the one or more parameters of the selected field devices via the BMS network, wherein modifying the one or more parameters comprises adjusting an operation performed by the selected BMS devices, the adjusted operation producing an output; and
      monitor, via the second network, the output of the selected field devices to determine the results of the tests,
   wherein the air balancing tool is configured to allow the user to balance an airflow associated with one or more BMS devices on the BMS network using the user device.

15. The system of claim 14, wherein the air balancing tool is further configured to automatically calibrate one or more of the field devices.

16. The system of claim 15, wherein the user device is a smartphone.

17. The system of claim 14, wherein the configuration device further comprises a web server, the web server configured to generate the user interface which is viewable by the user on the user device.

18. A building management system (BMS) interface device for providing communications between a user device and one or more BMS devices on a BMS network, the device comprising:
   a user device communication circuit configured to provide communication between the BMS interface device and one or more user devices;
   a BMS network communication circuit configured to provide communication between the BMS interface device and the BMS network; and
   a processing circuit, comprising a device checkout tool and an air balancing tool;
   wherein the device checkout tool is configured to;
      allow a user to select one or more BMS devices on the BMS network and to view data points associated with the selected devices;
      allow the user to select one or more tests to execute on the selected BMS devices, wherein the tests are configured to send a command to the BMS network communication circuit to modify the data points of the selected BMS devices via the BMS network, wherein the modified data points adjust an operation performed by the selected field devices, the adjusted operation producing an output; and
      monitor, via the second network, an output of the selected BMS devices to determine the results of the tests,
   wherein the air balancing tool is configured to balance an airflow associated with one or more BMS devices on the BMS network, the air balancing tool further configured to automatically calibrate one or more BMS devices on the BMS network by generating a gain value of the devices based on at least a measured minimum air flow, a maximum air flow, and a differential pressure.

19. The device of claim 18, wherein the BMS network is a BACnet network.

* * * * *